US009062820B2

(12) United States Patent
Allmendinger et al.

(10) Patent No.: US 9,062,820 B2
(45) Date of Patent: Jun. 23, 2015

(54) HOLDER MECHANISM FOR A MULTI-FUNCTION ELECTRONIC DEVICE

(75) Inventors: Otto Karl Allmendinger, Rowlett, TX (US); Brent W. Byers, Plano, TX (US)

(73) Assignee: TRAXXAS LP, McKinney, TX (US)

( * ) Notice: Subject to any disclaimer, the term of this patent is extended or adjusted under 35 U.S.C. 154(b) by 13 days.

(21) Appl. No.: 13/286,021

(22) Filed: Oct. 31, 2011

(65) Prior Publication Data
US 2013/0105656 A1 May 2, 2013

(51) Int. Cl.
A47B 91/00 (2006.01)
F16M 11/04 (2006.01)
F16M 13/00 (2006.01)
H04M 1/04 (2006.01)

(52) U.S. Cl.
CPC .............. *F16M 11/041* (2013.01); *F16M 13/00* (2013.01); *H04M 1/04* (2013.01)

(58) Field of Classification Search
USPC ........ 248/346.04, 316.1, 316.3, 316.4, 316.6, 248/309.1, 176.3, 292.13, 298.1, 346.03
See application file for complete search history.

(56) References Cited

U.S. PATENT DOCUMENTS

| | | | | |
|---|---|---|---|---|
| 5,121,863 A | * | 6/1992 | Kotitalo et al. | 224/570 |
| 5,252,965 A | | 10/1993 | Gidwani et al. | |
| 5,438,936 A | * | 8/1995 | Wang | 108/44 |
| 5,457,745 A | * | 10/1995 | Wang | 379/454 |
| 5,555,302 A | * | 9/1996 | Wang | 379/446 |
| 5,787,168 A | * | 7/1998 | Lien | 379/455 |
| 5,788,202 A | * | 8/1998 | Richter | 248/316.4 |
| 5,825,874 A | * | 10/1998 | Humphreys et al. | 379/446 |
| 5,836,563 A | * | 11/1998 | Hsin-Yung | 248/316.4 |
| 5,903,645 A | * | 5/1999 | Tsay | 379/455 |
| 5,937,065 A | | 8/1999 | Simon et al. | |
| 6,127,941 A | | 10/2000 | Van Ryzin | |
| 6,229,891 B1 | * | 5/2001 | Chen | 379/446 |
| 6,293,798 B1 | | 9/2001 | Boyle et al. | |
| 6,567,012 B1 | | 5/2003 | Matsubara et al. | |
| 6,658,328 B1 | | 12/2003 | Alrabady et al. | |

(Continued)

FOREIGN PATENT DOCUMENTS

CN 101505380 A 8/2009
DE 10 2007 038 666 A1 2/2009

(Continued)

OTHER PUBLICATIONS

PCT/US2012/062362; International Search Report and Written Opinion; Feb. 19, 2013.

(Continued)

*Primary Examiner* — Monica Millner
(74) *Attorney, Agent, or Firm* — CARR Law Firm PLLC

(57) ABSTRACT

In an embodiment, a holder mechanism is provided. The holder mechanism has an upper and a lower sliding plate, an upper and a lower lever guide arm, and an upper and a lower spring. The sliding plates have an adjustment lever plate rod slot and one or more fingers. The lever guide arms have a hinge end and a spring end and are hinged to their respective sliding plates at a hinge end. Each spring pulls the spring end of its respective lever guide arm and its respective sliding plate together. An adjustment lever between the sliding plates has an upper and a lower guide rod. Each guide rod is between the respective sliding plate and the respective lever guide arm. An adjustment lever plate rod passes through adjustment lever plate rod slots in the upper and lower sliding plates, and is connected to the adjustment lever.

19 Claims, 28 Drawing Sheets

(56) References Cited

U.S. PATENT DOCUMENTS

| | | | |
|---|---|---|---|
| 6,741,684 B2 | 5/2004 | Kaars | |
| 6,785,567 B2* | 8/2004 | Kato | 455/575.9 |
| 6,944,294 B2* | 9/2005 | Tsay | 379/446 |
| 6,959,899 B2* | 11/2005 | Yeh | 248/346.03 |
| 7,080,812 B2 | 7/2006 | Wadsworth et al. | 248/316.6 |
| 7,158,092 B2* | 1/2007 | Shen | 343/878 |
| 7,174,518 B2 | 2/2007 | Kim | |
| 7,224,262 B2 | 5/2007 | Simon et al. | |
| 7,231,294 B2 | 6/2007 | Bodin et al. | |
| 7,233,844 B2 | 6/2007 | Peltz et al. | |
| 7,268,664 B2 | 9/2007 | Tanaka et al. | |
| 7,307,573 B2 | 12/2007 | Choi | |
| 7,391,320 B1 | 6/2008 | Beard et al. | |
| 7,407,143 B1* | 8/2008 | Chen | 248/309.1 |
| 7,418,097 B2* | 8/2008 | Chang | 379/446 |
| 7,486,193 B2 | 2/2009 | Elwell | |
| 7,537,190 B2* | 5/2009 | Fan | 248/309.1 |
| 7,614,595 B2* | 11/2009 | Richter | 248/346.01 |
| 7,681,194 B2 | 3/2010 | Van Ee et al. | |
| 7,828,259 B2* | 11/2010 | Wang et al. | 248/316.4 |
| 7,967,262 B2* | 6/2011 | O'Brien et al. | 248/205.5 |
| 8,136,780 B2* | 3/2012 | Lin | 248/316.4 |
| 8,138,894 B2 | 3/2012 | Kato et al. | |
| 8,240,628 B2* | 8/2012 | Huang | 248/316.1 |
| 8,262,070 B2* | 9/2012 | Liu | 269/254 R |
| 8,282,063 B2* | 10/2012 | Ou et al. | 248/346.04 |
| 8,376,301 B2* | 2/2013 | Fan | 248/316.4 |
| 8,405,974 B2* | 3/2013 | Sayavong | 361/679.43 |
| 8,500,080 B2* | 8/2013 | Hu | 248/346.07 |
| 2001/0042631 A1 | 11/2001 | Carrier | |
| 2002/0187726 A1 | 12/2002 | Yamaguchi | |
| 2003/0148703 A1 | 8/2003 | Scott et al. | |
| 2004/0018800 A1 | 1/2004 | Caiozza | |
| 2004/0077284 A1 | 4/2004 | Bonilla et al. | |
| 2004/0091102 A1 | 5/2004 | Tsay | |
| 2004/0179469 A1 | 9/2004 | Attar et al. | |
| 2004/0179678 A1* | 9/2004 | Hsu Li | 379/441 |
| 2005/0048918 A1 | 3/2005 | Frost et al. | |
| 2005/0088275 A1 | 4/2005 | Valoteau et al. | |
| 2005/0168373 A1 | 8/2005 | Mukaida | |
| 2005/0236536 A1* | 10/2005 | Fan | 248/176.3 |
| 2006/0113428 A1 | 6/2006 | Choi | |
| 2006/0145039 A1* | 7/2006 | Shawver | 248/309.1 |
| 2006/0183405 A1 | 8/2006 | Mathews | |
| 2006/0293102 A1 | 12/2006 | Kelsey | |
| 2007/0001805 A1 | 1/2007 | Utter et al. | |
| 2007/0035412 A1 | 2/2007 | Dvorak et al. | |
| 2007/0262223 A1 | 11/2007 | Wang et al. | |
| 2007/0284500 A1* | 12/2007 | Fan | 248/346.06 |
| 2007/0293124 A1 | 12/2007 | Smith et al. | |
| 2008/0285628 A1 | 11/2008 | Gizis et al. | |
| 2009/0195407 A1 | 8/2009 | Nakano et al. | |
| 2009/0262002 A1 | 10/2009 | Alexander et al. | |
| 2009/0294617 A1* | 12/2009 | Stacey et al. | 248/316.1 |
| 2011/0288696 A1 | 11/2011 | Lefebure | |
| 2012/0015686 A1 | 1/2012 | Krupnik | |

FOREIGN PATENT DOCUMENTS

| | | |
|---|---|---|
| DE | 10 2007 03866 A1 | 2/2009 |
| EP | 1736948 A1 | 12/2006 |
| EP | 1973313 A1 | 9/2008 |
| EP | 2296122 A2 | 3/2011 |
| EP | 2384796 A1 | 11/2011 |
| EP | 2416049 A2 | 2/2012 |
| JP | 5086759 A | 4/1993 |
| JP | 5106376 A | 4/1995 |
| JP | 1998-108985 A | 4/1998 |
| JP | 2001-162061 A | 6/2001 |
| JP | 2002-345050 A | 11/2002 |
| JP | 2003-087878 A | 2/2003 |
| JP | 2004-64418 A | 2/2004 |
| JP | 2005-198728 A | 7/2005 |
| JP | 2007-251349 A | 9/2007 |
| JP | 2008-206670 A | 2/2008 |
| JP | 2009-177767 A | 8/2009 |
| TW | M395337 U1 | 12/2010 |
| WO | WO 2004/052484 A2 | 6/2004 |
| WO | WO 2010/042219 A2 | 4/2010 |

OTHER PUBLICATIONS

PCT/US2012/062359; International Search Report and Written Opinion; Mar. 7, 2013.

PCT/US2013/062613; International Search Report and Written Opinion; Apr. 23, 2013.

SPEKTRUM RC; "ModelMatch"; Horizon Hobby Inc., Champaign IL; 2005-2010; http://www.spektrumrc.com/DSM/Technology/modelmatch.aspx.

SPEKTRUM; "3-Channel, 4-Model Memory DSM Racing System" instruction manual; Horizon Hobby Inc., Champaign IL; 2009.

Futaba; "FASST 2.4GHz Module & R603FS Receiver" brochure; Great Planes Model Distr. Co., Champaign IL, 2006.

Futaba; "Futaba 2.4GHz FASST System Features"; 2007-2010 Hobbico Inc.; http://2.4gigahertz.com/features/features.html.

Futaba; "3GR-2.4GHz System" manual; Futaba Corp., Japan, 2007.

Futaba; "3PM w/2.4GHz FASST System" brochure; Great Planes Model Distr. Co., Champaign IL, 2007; www.2.4gigahertz.com.

Futaba; "3PM-2.4GHz System" manual; Futaba Corp., Japan, 2007.

Futaba; "4PK 4-Channel Computer Systems" brochure; Great Planes Model Distr. Co., Champaign IL, 2007.

Futaba; "6EX w/2.4GHz FASST System" brochure; Great Planes Model Distr. Co., Champaign IL, 2007.

Futaba; "6EX-2.4GHz Instruction Manual"; Futaba Corp., Japan, 2007.

Futaba; "Futaba Model Data Converter" manual; Futaba Corp., Japan 2008.

Futaba; "7C 7-Channel FASST Computer System" brochure; Great Planes Model Distr. Co., Champaign IL, 2007.

Futaba; "7C-2.4GHz Instruction Manual"; Futaba Corp., Japan, 2007.

Futaba; "12FG 12-Channel Computer Systems" brochure; Great Planes Model Distr. Co., Champaign IL, 2007.

Futaba; "FASST Air System TM-7 RF Module and R607FS Receiver Instruction Manual"; Futaba Corp., Japan, 2007.

Futaba; "FASST Air System TM-14 RF Module and R6014FS Receiver Instruction Manual"; Futaba Corp., Japan, 2007.

Futaba; "FASST Air System TM-8 RF Module and R608FS Receiver Instruction Manual"; Futaba Corp., Japan, 2008.

Futaba; "14MZ 14-Channel Computer Systems" brochure; Great Planes Model Distr. Co., Champaign IL, 2008.

Futaba; "4PK-2.4GHz System" manual; Futaba Corp., Japan, 2008.

Futaba; "Manual Changes—Instruction Manual—Throttle-cut function"; Futaba Corp., Japan, 2008.

Futaba; "R6004FF" receiver manual; Futaba Corp., Japan, 2008.

Futaba; 10CAP/10CHP/10CP 10-Channel Radio Control System Instruction Manual; Futaba Corp., Japan, 2008.

Futaba; "3PM-X 3-Channel 2.4GHz FASST Computer System" brochure; Great Planes Model Distr. Co., Champaign IL, Hobbico Inc. 2009.

Futaba; "3PM-2.4G MX 3-channel FASST Radio control system for car Instruction Manual"; Futaba Corp., Japan, 2009.

Futaba; "8FG FASST 8-Channel 2.4GHz Computer System" brochure; Great Planes Model Distr. Co., Champaign IL, Hobbico Inc. 2009.

Futaba; "8FG 8-Channel Radio Control System Instruction Manual"; Futaba Corp., Japan, 2009.

Futaba; 10CAG/10CHG/10CG 10-Channel Radio Control System Instruction Manual; Futaba Corp., Japan, 2009.

Futaba; "Wireless Trainer System WTR-7 Instruction Manual"; Futaba Corp., Japan, 2009.

Futaba; "R6108SB S.BUS compatible/FASST-2.4GHz (Multi-ch) system 8 channels/high-speed receiver" manual; Futaba Corp., Japan, 2010.

(56) References Cited

OTHER PUBLICATIONS

Futaba; "S.BUS Decoder SBD-1 Instruction Manual"; Futaba Corp., Japan, 2010.
Futaba; "S.BUS Servo Usage Precautions" manual; Futaba Corp., Japan, 2010.
Futaba; "S.BUS System Channel Changer SBC-1 Instruction Manual"; Futaba Corp., Japan, 2010.
Futaba; "We Put the Future of R/C in Your Hands" catalog; Hobbico, Inc., 2010; futaba-rc.com, www.2.4gigahertz.com.
Horizon Hobby; "QuickConnect Voltage Recovery System for DSM2 Air receivers"; Horizon Hobby, Inc.; Dec. 1, 2008. https://www.spektrumrc.com/Articles/Article.aspx?ArticleID=1855.
RC Universe; "Spektrum Receiver new "Quick Connect" feature"; www.rcuniverse.com/forum; Dec. 18, 2007. http://www.rcuniverse.com/forum/jr-radio-spektrum-radios-116/6773703-spektrum-receiver-new-quick-connectfeature.html#post6773703.
SPEKTRUM; "SPEKTRUM DX6i • Radio Programming Guide"; Horizon Hobby, Inc.; Aug. 2009. http://www.spektrumrc.com/ProdInfo/Files/SPM6600-Manual_DX6i.pdf.

* cited by examiner

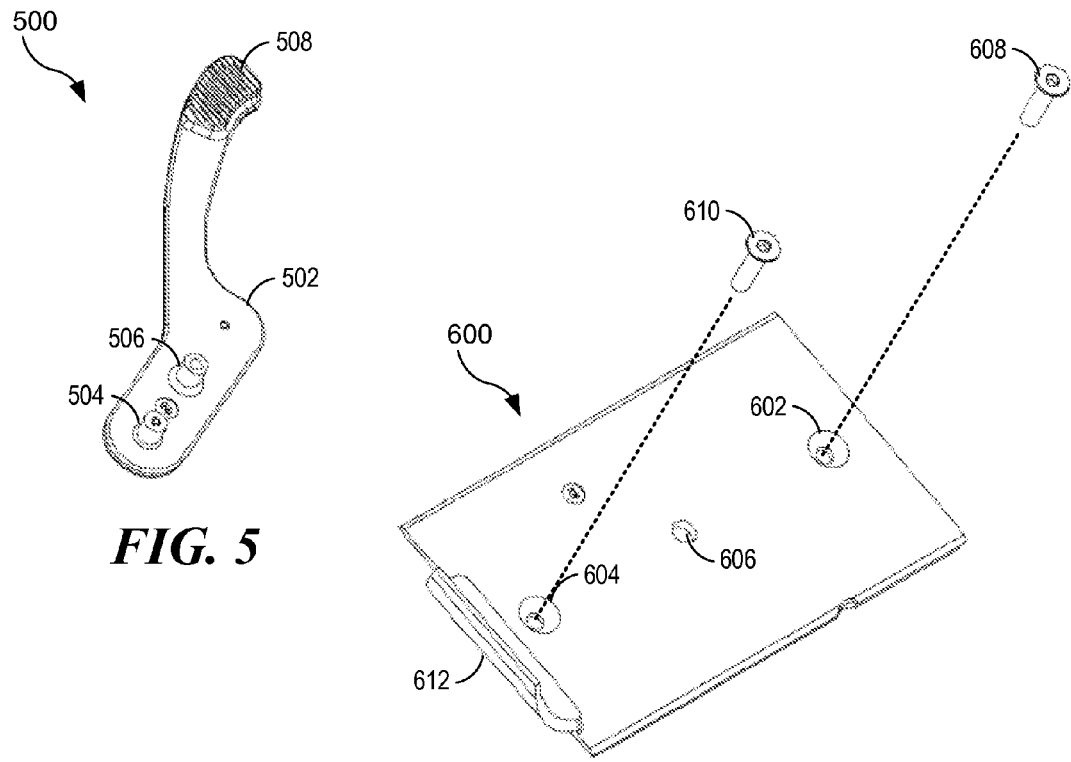
FIG. 5
FIG. 6
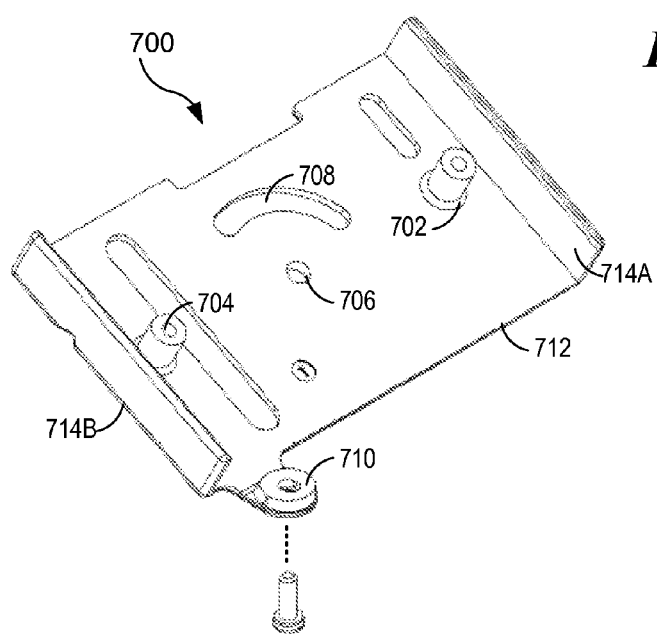
FIG. 7

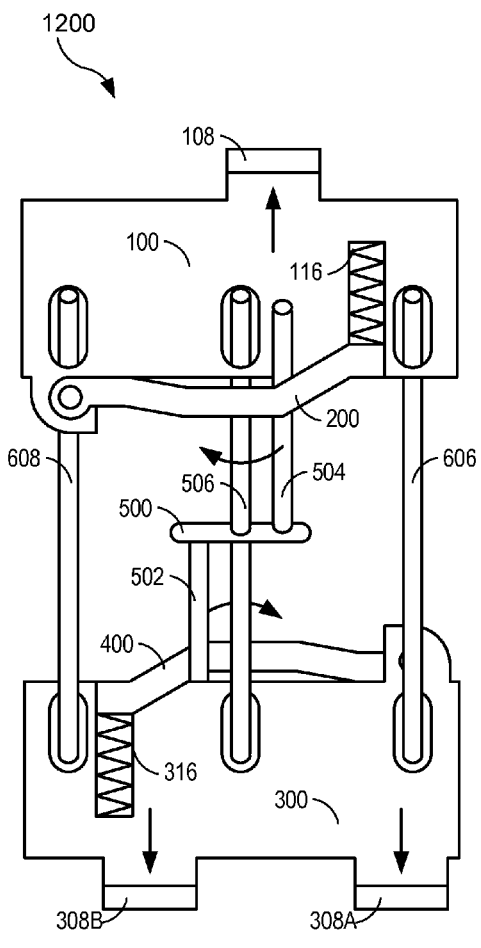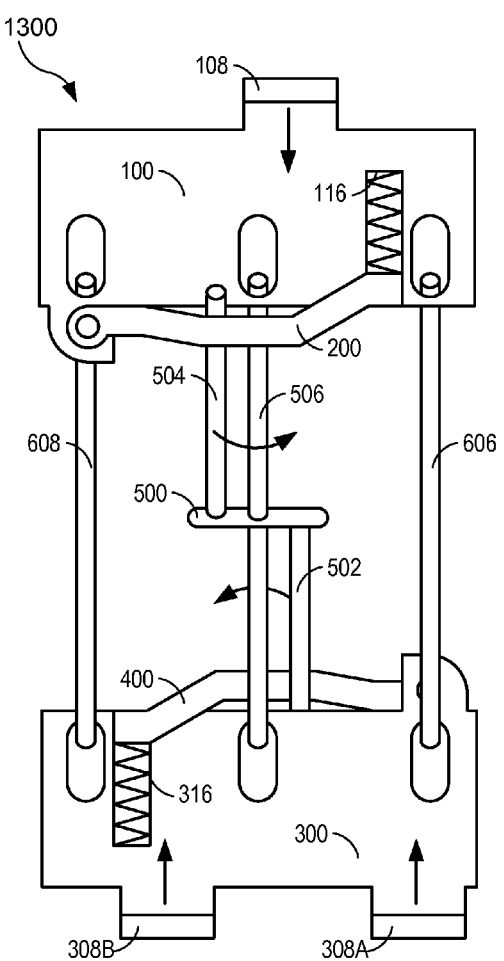
FIG. 12　　　　FIG. 13

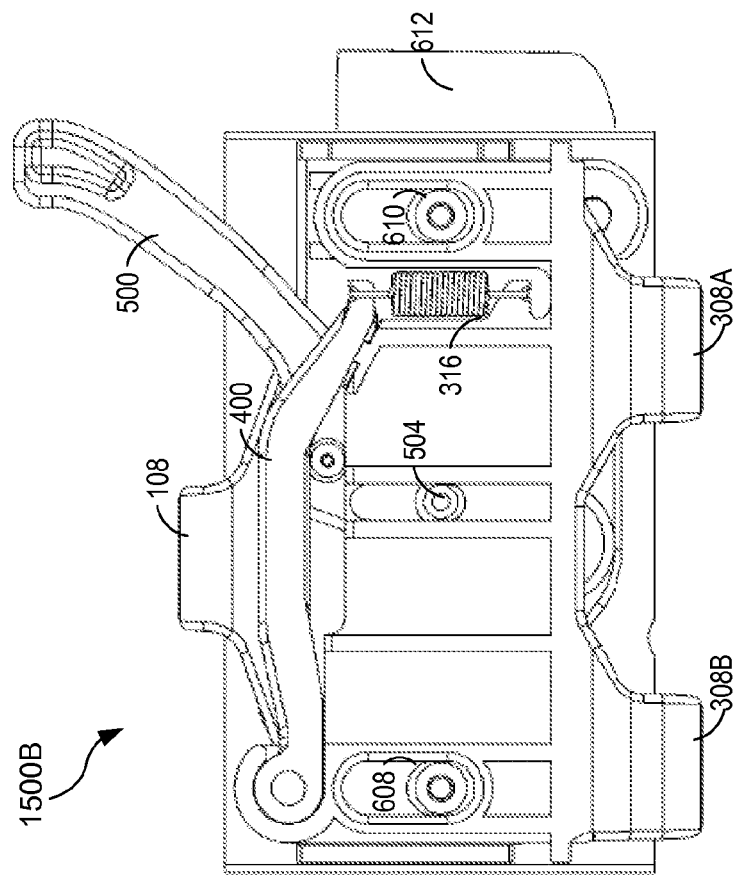
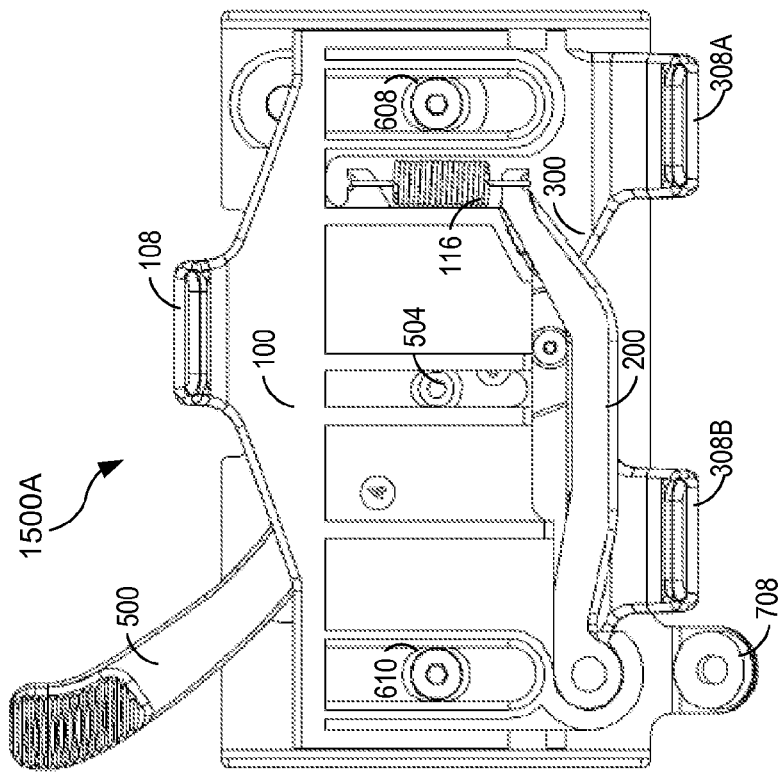

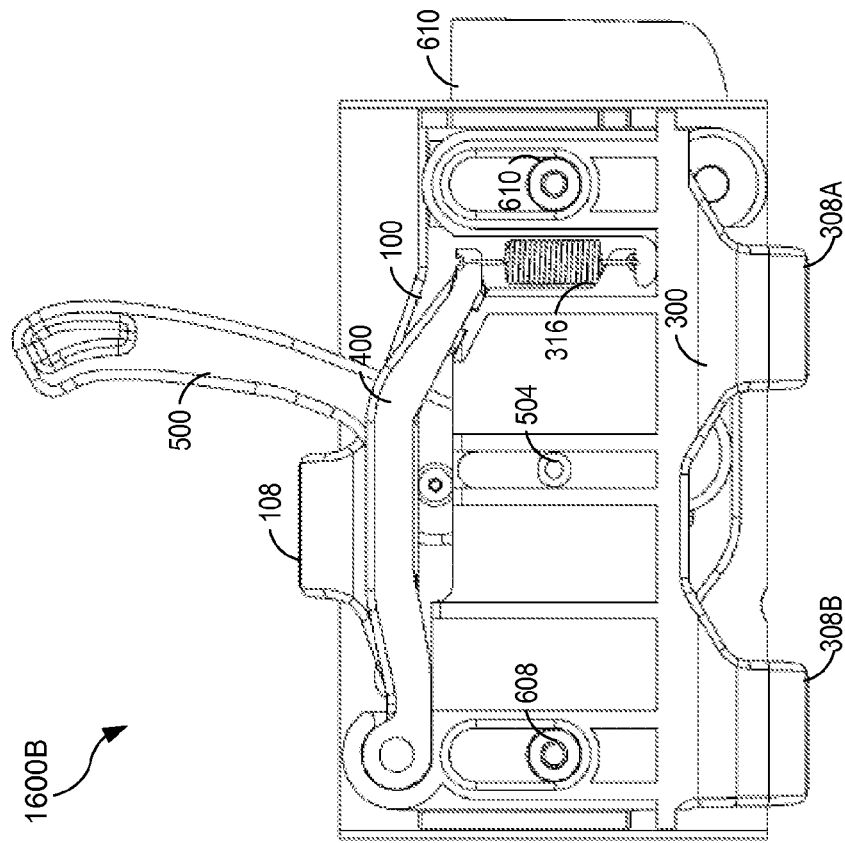
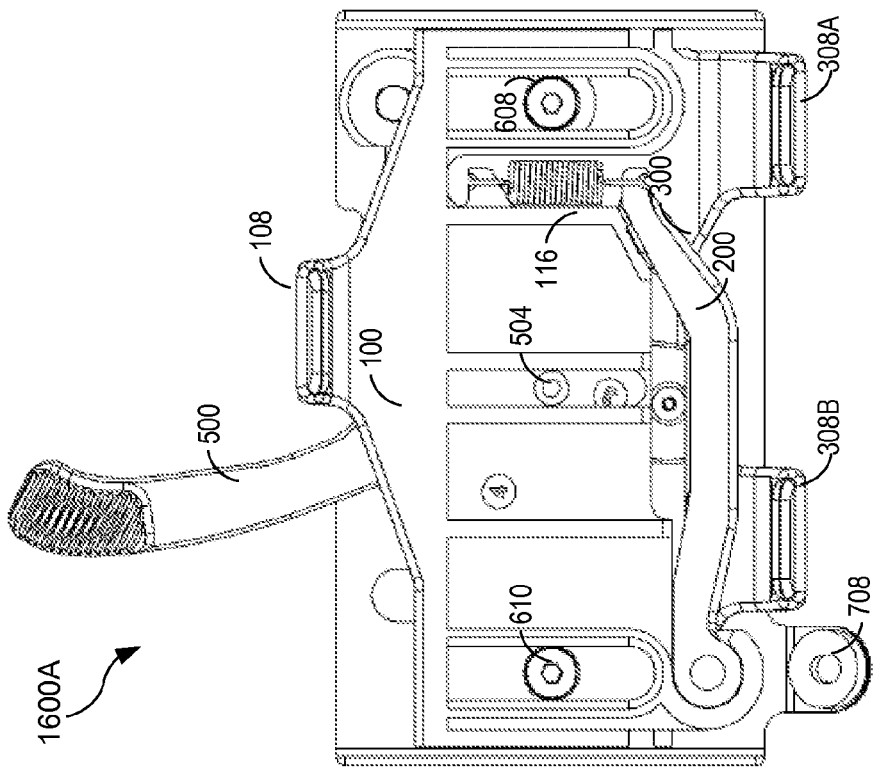

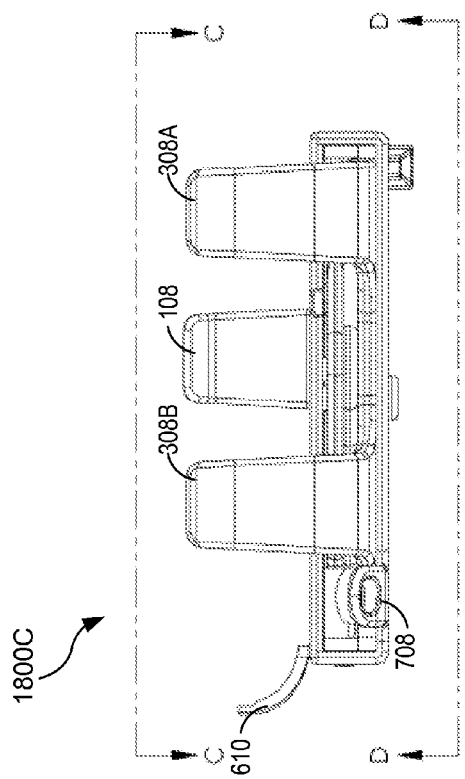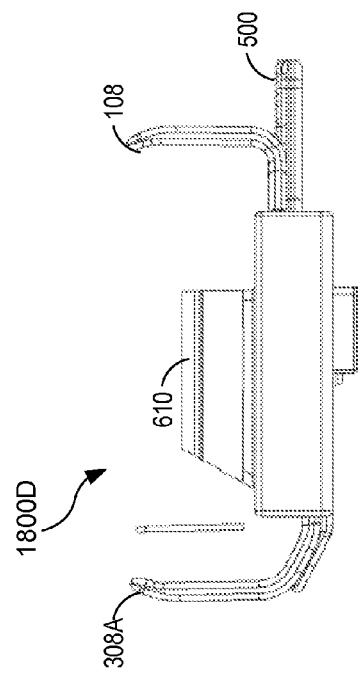
FIG. 18C
FIG. 18D

HOLDER MECHANISM FOR A MULTI-FUNCTION ELECTRONIC DEVICE

TECHNICAL FIELD

This application relates to holding multi-function electronic devices and, more particularly, to holding multi-function electronic devices to model vehicle transmit controllers.

BACKGROUND

As described in co-pending U.S. patent application Ser. No. 12/850,453, a model vehicle transmit controller may be improved by the addition of an auxiliary user interface. The auxiliary user interface may be provided in a portable multi-function electronic device (MFED). The MFED may be a smart phone or music player, both of which are commonly available devices with significant computing power. Exemplary MFEDs are the iPhone and iPod Touch produced by Apple Inc.

Transmit controllers are commonly designed to be used with two hands. Therefore, it may be necessary to secure an MFED to the transmit controller so the user's hands are not occupied by the MFED when the user is using the transmit controller. However, MFEDs are fragile and should be held securely in place. It would be undesirable for several reasons if an MFED were to separate from the transmit controller by accident. First, the user would not be able to use the auxiliary user interface provided by the MFED. Second, any physical connections between the MFED and the transmit controller may become damaged. Third, the MFED may be damaged if it contacts another surface.

Complicating the problem of securing an MFED is that MFEDs can have a variety of sizes and are commonly enclosed in cases of varying thicknesses. A space of a fixed size cannot accommodate these variations in MFEDs. Thus, a need exists for a transmit controller which can secure MFEDs of varying sizes.

Additionally, a transmit controller requires additional hardware components to communicate with an MFED. These additional hardware components can increase the cost of the transmit controller. Some buyers may be uninterested in or uncertain about using an MFED with a transmit controller. These buyers may be unwilling to purchase a more expensive transmit controller, but may later decide the advantages of an auxiliary user interface make an MFED-enabled transmit controller worthwhile. It would be desirable if a person could "upgrade" a transmit controller which is not MFED-enabled, rather than having to purchase a second transmit controller.

SUMMARY

In an embodiment, a holder mechanism is provided. The holder mechanism has an upper and a lower sliding plate, an upper and a lower lever guide arm, and an upper and a lower spring. The sliding plates have an adjustment lever plate rod slot and one or more fingers. The lever guide arms have a hinge end and a spring end and are hinged to their respective sliding plates at a hinge end. Each spring pulls the spring end of its respective lever guide arm and its respective sliding plate together. An adjustment lever between the sliding plates has an upper and a lower guide rod. Each guide rod is between the respective sliding plate and the respective lever guide arm. An adjustment lever plate rod passes through adjustment lever plate rod slots in the upper and lower sliding plates, and is connected to the adjustment lever.

DESCRIPTION OF DRAWINGS

For a more complete understanding of the present invention and the advantages thereof, reference is now made to the following Detailed Description taken in conjunction with the accompanying drawings, in which:

FIG. 5 is a scale view of an adjustment lever in accordance with an exemplary embodiment of the present invention;

FIG. 6 is a scale view of an upper cover plate in accordance with an exemplary embodiment of the present invention;

FIG. 7 is a scale view of a lower cover plate in accordance with an exemplary embodiment of the present invention;

FIG. 12 is a simplified diagram of a holder mechanism in accordance with an exemplary embodiment of the present invention, with the adjustment lever in a closed position and no MFED in the holder mechanism;

FIG. 13 is a simplified diagram of a holder mechanism in accordance with an exemplary embodiment of the present invention, with the adjustment lever in an open position;

FIGS. 15A-15D are respectively scale top, bottom, right side, and far views of a holder mechanism in accordance with an exemplary embodiment of the present invention, with the adjustment lever in a closed position and no MFED in the holder mechanism;

FIGS. 16A-16D are respectively scale top, bottom, right side, and far views of a holder mechanism in accordance with an exemplary embodiment of the present invention, with the adjustment lever partway between an open position and a closed position and no MFED in the holder mechanism;

FIGS. 18A-18D are respectively scale top, bottom, right side, and far views of a holder mechanism in accordance with an exemplary embodiment of the present invention, with the adjustment lever in a closed position and an MFED in the holder mechanism;

DETAILED DESCRIPTION

In the following discussion, numerous specific details are set forth to provide a thorough explanation. However, such specific details are not essential. In other instances, well-known elements have been illustrated in schematic or block diagram form. Additionally, for the most part, specific details within the understanding of persons of ordinary skill in the relevant art have been omitted.

As used herein, the terms "far," "near," "left," and "right" are relative to the operator of a transmit controller having an exemplary holder mechanism for an MFED. A "far-near" axis is perpendicular to a "left-right" axis. The directions are given for ease of discussion, but it should be noted that the directions are only one example of possible orientations of a holder mechanism relative to an operator. In the orientation of FIGS. 1-11, "far" is toward the upper-right of the drawings, "near" is toward the lower-left, "left" is toward the upper-left, and "right" is toward the lower-right.

Figure 1:
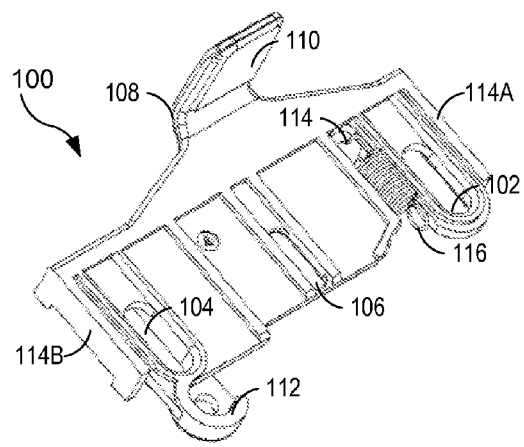
FIG. 1 is a scale view of an upper sliding plate in accordance with an exemplary embodiment of the present invention.

Referring to FIG. 1, depicted is an exemplary upper sliding plate 100. Upper sliding plate 100 has a far slot 102, a near slot 104, a middle slot 106. Upper sliding plate 100 also has a left finger 108 with a left gripping pad 110. Left pad 110 will grip an MFED from the left side. Left pad 110 may be constructed from silicone. The upper sliding plate 100 of FIG. 1 has only a single left finger 108 and left pad 110, but any number of left fingers 108 and left pads 110 is possible.

Upper lever guide arm port 112 receives an upper lever guide arm from above. Upper lever guide arm port 112 has a hole for securing the upper lever guide arm to upper lever guide arm port 112 while permitting the upper lever guide arm to rotate with respect to upper sliding plate 100. Spring hook 114 holds one end of a spring 116.

Figure 2:
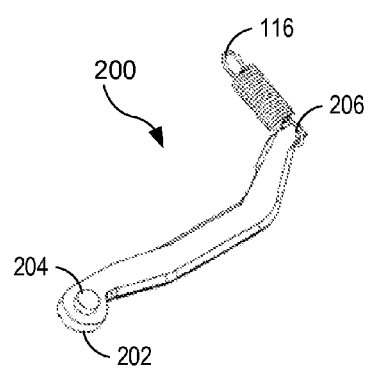
FIG. 2 is a scale view of an upper lever guide arm in accordance with an exemplary embodiment of the present invention.

Referring to FIG. 2, depicted is an exemplary upper lever guide arm 200. Upper lever guide arm 200 has a lower boss 202 which holds upper lever guide arm 200 in the upper lever guide arm port in the upper sliding plate. Upper lever guide arm 200 may optionally have an upper boss 204. Upper boss 204 permits upper lever guide arm 200 to function as a lower lever guide arm, which will be described below with reference to FIG. 4, when upper lever guide arm 200 is inverted. Upper boss 204 has no function when upper lever guide arm 200 is used as an upper lever guide arm. Spring hook 206 holds the other end of spring 116.

Referring to FIGS. 1-2, upper lever guide arm 200 is attached to upper sliding plate 100 at two points. First, lower boss 202 fits into upper lever guide arm port 112, forming a hinge. Second, spring hook 206 is attached to spring hook 114 through spring 116. Spring 116 pulls upper lever guide arm 200 adjacent to upper sliding plate 100. If the resistance exerted by spring 116 is overcome, upper lever guide arm 200 may rotate clockwise about lower boss 202, away from upper sliding plate 100. Spring 116 is preloaded to reduce the variation in force at the different positions of upper lever guide arm 200. As will be described below with reference to FIGS. 13-14, the maximum distance between spring hook 206 and spring hook 114 is limited by the width of slots 102, 104, and 106.

Figure 3:
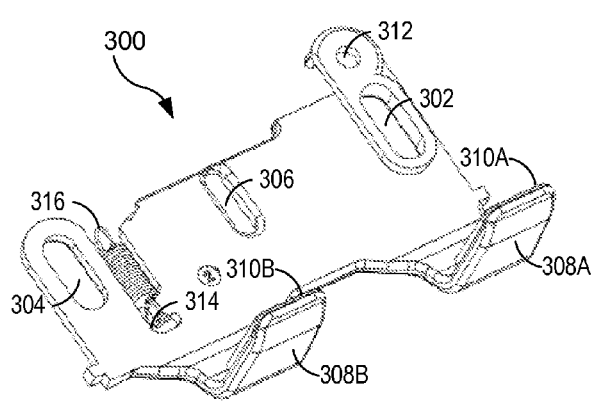
FIG. 3 is a scale view of a lower sliding plate in accordance with an exemplary embodiment of the present invention.

Referring to FIG. 3, depicted is an exemplary lower sliding plate 300. Lower sliding plate 300 has a far slot 302, a near slot 304, a middle slot 306. Lower sliding plate 300 also has a right finger 308A with a right pad 310A and a right finger 308B with a right pad 310B. Right pads 310A and 310B will grip an MFED from the right side. Right pads 310A and 310B may be constructed from silicone. The lower sliding plate 300 of FIG. 3 has two right fingers 308A and 308B and right pads 310A and 310B, but any number of right fingers 108 and right pads 110 is possible.

Lower lever guide arm port 312 receives a lower lever guide arm from below. Lower lever guide arm port 312 has a hole for securing the lower lever guide arm to lower lever guide arm port 312 while permitting the lower lever guide arm to rotate with respect to lower sliding plate 300. Spring hook 314 holds one end of a spring 316.

Figure 4:
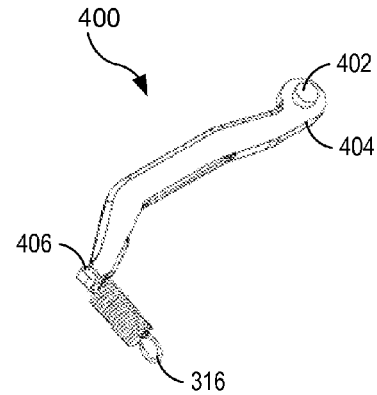
FIG. 4 is a scale view of a lower lever guide arm in accordance with an exemplary embodiment of the present invention.

Referring to FIG. 4, depicted is an exemplary lower lever guide arm 400. Lower lever guide arm 400 is identical to upper lever guide arm 200 in FIG. 2 inverted. Lower lever guide arm 400 has an upper boss 402 which holds lower lever guide arm 400 in the lower lever guide arm port in the lower sliding plate. Lower lever guide arm 400 may optionally have a lower boss 404. Lower boss 404 permits lower lever guide arm 400 to function as an upper lever guide arm, described above with reference to FIG. 2, when lower lever guide arm 400 is inverted. Lower boss 404 has no function when lower lever guide arm 400 is used as a lower lever guide arm. Spring hook 406 holds the other end of spring 316.

Referring to FIGS. 3-4, lower lever guide arm 400 is attached to lower sliding plate 300 at two points. First, upper boss 402 fits into lower lever guide arm port 312, forming a hinge. Second, spring hook 406 is attached to spring hook 314 through spring 316. Spring 316 pulls lower lever guide arm 400 adjacent to lower sliding plate 200. If the resistance exerted by spring 316 is overcome, lower lever guide arm 400 may rotate clockwise about upper boss 402, away from lower sliding plate 200. Spring 316 is preloaded to reduce the variation in force at the different positions of lower lever guide arm 400. As will be described below with reference to FIGS. 13-14, the maximum distance between spring hook 406 and spring hook 314 is limited by the width of slots 302, 304, and 306.

Referring to FIG. 5, depicted is an exemplary adjustment lever 500. Adjustment lever 500 has a lower guide rod 502 on its lower side, which is not visible in FIG. 5. Adjustment lever 500 also has an upper guide rod 504 on the upper side and an adjustment lever plate rod 506. Adjustment lever plate rod 506 is made up of two protrusions from the adjustment lever, one extending upward and one extending downward.

Lower guide rod 502 contacts the lower lever guide arm and lower sliding plate. Upper guide rod 504 contacts the upper lever guide arm and upper sliding plate. When the holder mechanism opens, the guide rods push primarily against the sliding plates to move the sliding plates apart, separating the fingers. When the holder mechanism closes, the guide rods push primarily against the lever guide arms to move the sliding plates together, closing the fingers. Adjustment lever plate rod 506 passes through the middle slots of the upper sliding plate and the lower sliding plate into holes in an upper cover plate and a lower cover plate. The user moves the adjustment lever using textured grip 508.

Referring to FIG. 6, depicted is an exemplary upper cover plate 600. Upper cover plate 600 has a far hole 602, a near hole 604, and a middle hole 606. Far cover plate rod 608 and near cover plate rod 610 are the shanks of two screws. Far cover plate rod 608 passes through far hole 602, the far slots in the upper sliding plate and the lower sliding plate, and a far socket in a lower cover plate. Near cover plate rod 610 passes through near hole 604, the near slots in the upper sliding plate and the lower sliding plate, and a near hole in a lower cover plate. Middle hole 606 receives the adjustment lever plate rod in the adjustment lever. Interior cover 612 closes a gap between upper cover plate 600 and the exterior of the transmit controller.

Referring to FIG. 7, depicted is an exemplary lower cover plate 700. Lower cover plate 700 has a far socket 702, a near socket 704, and a middle hole 706. Far socket 702 receives the far cover plate rod passing through the far hole in the upper cover plate and the far slots in the upper and lower sliding plates. Near socket 704 receives the near cover plate rod passing through the near hole in the upper cover plate and the near slots in the upper and lower sliding plates. Because the far cover plate rod and near cover plate rod are screws, they screw into far socket 702 and near socket 704. Middle hole 706 receives the adjustment lever plate rod in the adjustment lever. Track 708 provides clearance for the movement of the lower guide rod in the adjustment lever. Fastener 710 receives a screw for securing lower cover plate 700 to a socket in the upper portion of the transmit controller base. Groove 712 on the lower side of exemplary lower cover plate 700 receives a boss in the lower portion of the transmit controller base, holding lower cover plate 700 in place. Far wall 714A and near wall 714B cover the near and far ends of the upper cover plate, upper sliding plate, and lower sliding plate.

Figure 8:
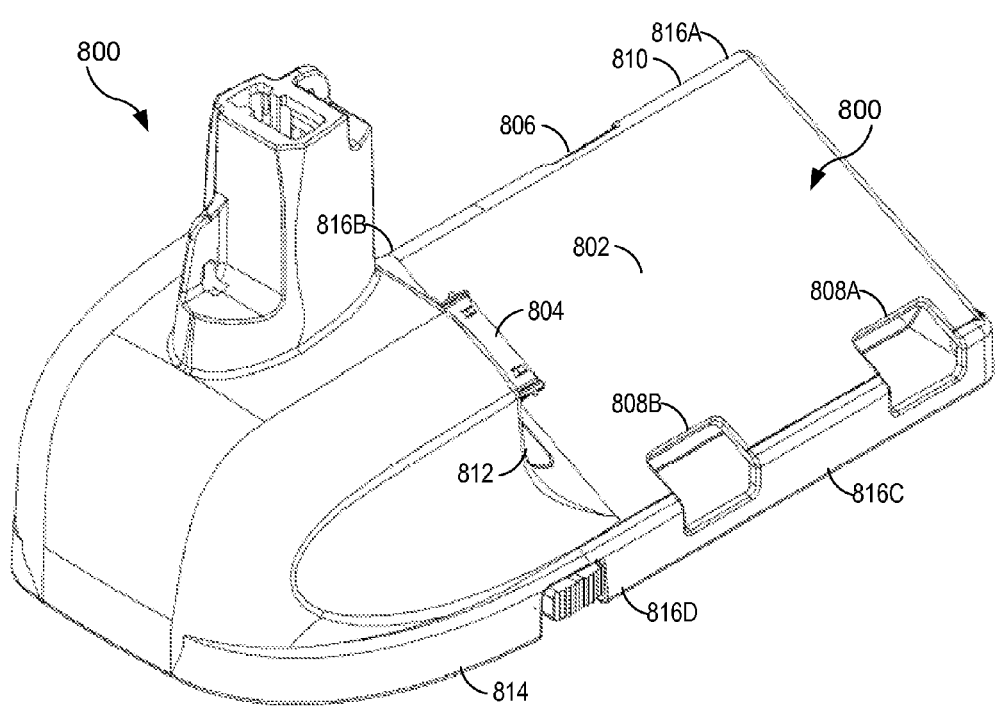
FIG. 8 is a scale view of a transmit controller upper base portion in accordance with an exemplary embodiment of the present invention.

Referring to FIG. 8, depicted is an exemplary transmit controller base upper portion 800. Transmit controller base upper portion 800 has an MFED rest surface 802 and an MFED connector 804. The MFED rests on MFED rest surface 802. An external interface of the MFED connects to auxiliary user interface connector 804. Here, auxiliary user interface connector 804 is an electrical connector for a wired connection to the MFED. Another possible auxiliary user interface connector 804 is a wireless transceiver for a wireless connection to the MFED, such as a Bluetooth or IEEE 802.11 (Wi-Fi) connection. Transmit controller base upper portion 800 may have an authentication chip which authenticates a connected MFED as an MFED which transmit controller base upper portion 800 may communicate with.

When the user is operating the MFED, the transmit controller is normally rotated 90 degrees to the right from its position when the user is operating the transmit controller itself. MFED rest surface 802 is preferably sloped, so that the transmit controller does not obstruct the user's view of and access to the MFED.

The left finger of the upper sliding plate extends through left opening 806. The right fingers of the lower sliding plate extend through right openings 808A and 808B. A transmit controller upper base portion 800 may have more or less openings as is necessary to accommodate more or fewer fingers. The adjustment lever may extend through an adjustment lever slot 810 to permit manipulation of the adjustment lever. The interior cover of the upper cover plate closes gap 812 below MFED connector 804. A socket 814 on the bottom of transmit controller upper base portion 800 receives a screw which passes through the fastener in the lower cover plate, securing the lower cover plate inside transmit controller upper base portion 800. Three additional sockets 816A, 816B, 816C, and 816D receive screws which pass through holes in a transmit controller lower base portion.

Figure 9:
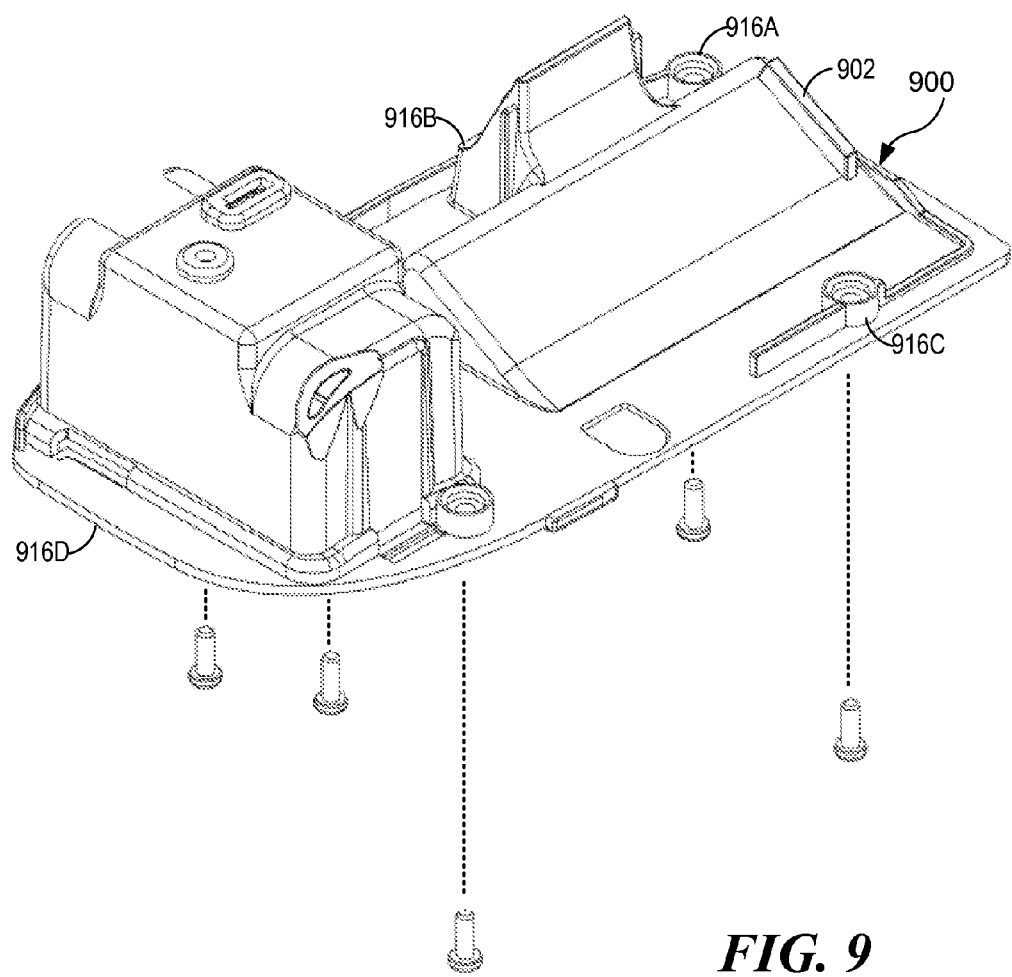
FIG. 9 is a scale view of a transmit controller lower base portion in accordance with an exemplary embodiment of the present invention.

Referring to FIG. 9, depicted is an exemplary transmit controller lower base portion 900. Lower base portion 900 has a boss 802 which slides into the groove on the lower side of the lower cover plate. Holes 904A, 904B, 904C, and 904D receive screws which pass into the sockets in the transmit controller upper base portion, connecting the upper and lower transmit controller base portions. The connected upper and lower transmit controller base portions enclose the lower and upper cover plates, the lower and upper sliding plates, the lower and upper lever guide arms, and a portion of the adjustment lever.

Figure 10:
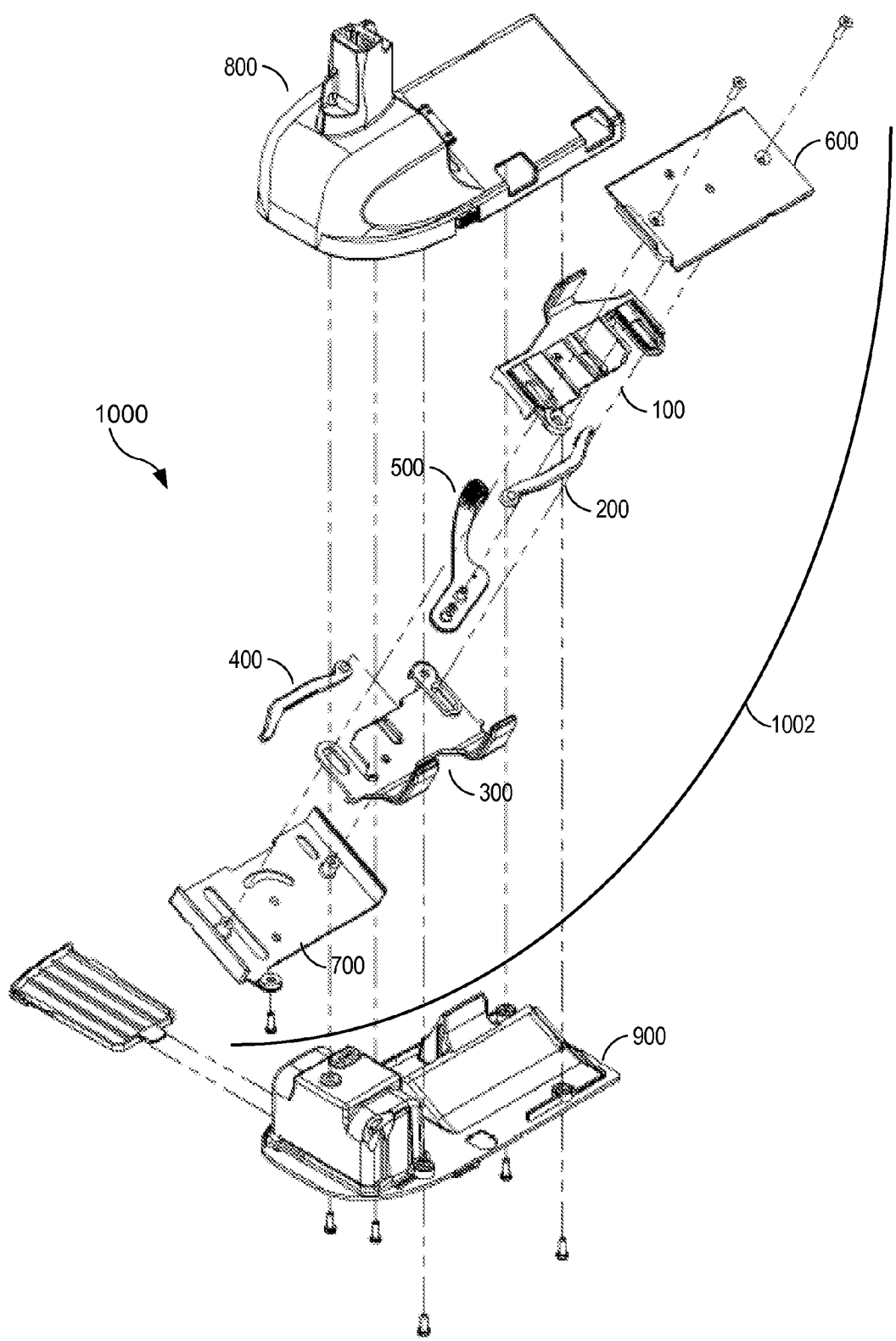
FIG. 10 is a scale exploded view of an assembled transmit controller base containing an assembled holder mechanism in accordance with an exemplary embodiment of the present invention.
Figure 11:
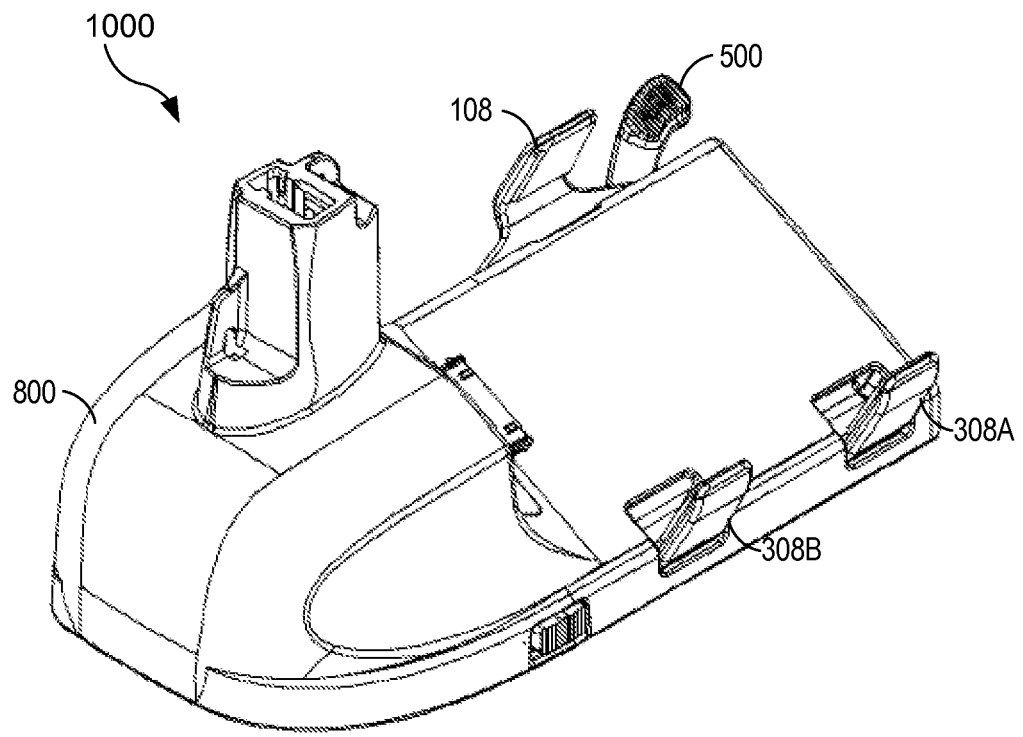
FIG. 11 is a scale view of an assembled transmit controller base containing an assembled holder mechanism in accordance with an exemplary embodiment of the present invention.

Referring to FIG. 10, depicted is an exploded view of an assembled MFED-compatible base module 1000 containing an assembled holder mechanism 1002. Holder mechanism 1002 comprises, in order from top to bottom, upper cover plate 600, upper lever guide arm 200, upper sliding plate 100, adjustment lever 500, lower sliding plate 300, lower lever guide arm 400, and lower cover plate 700. Holder mechanism 1002 is inside the hollow interior of the connected transmit cover upper base portion 800 and transmit controller lower base portion 900. Connecting holder mechanism 1002 to transmit controller upper base portion 800 is the screw passing through the fastener in lower cover plate 700 into the socket in transmit controller upper base portion 900. Connecting holder mechanism 1002 to transmit controller lower base portion 900 is the boss in transmit controller lower base portion 900 received by the groove in the bottom of lower cover plate 700. The assembled MFED-compatible base module 1000 is depicted in FIG. 11.

Figure 14:
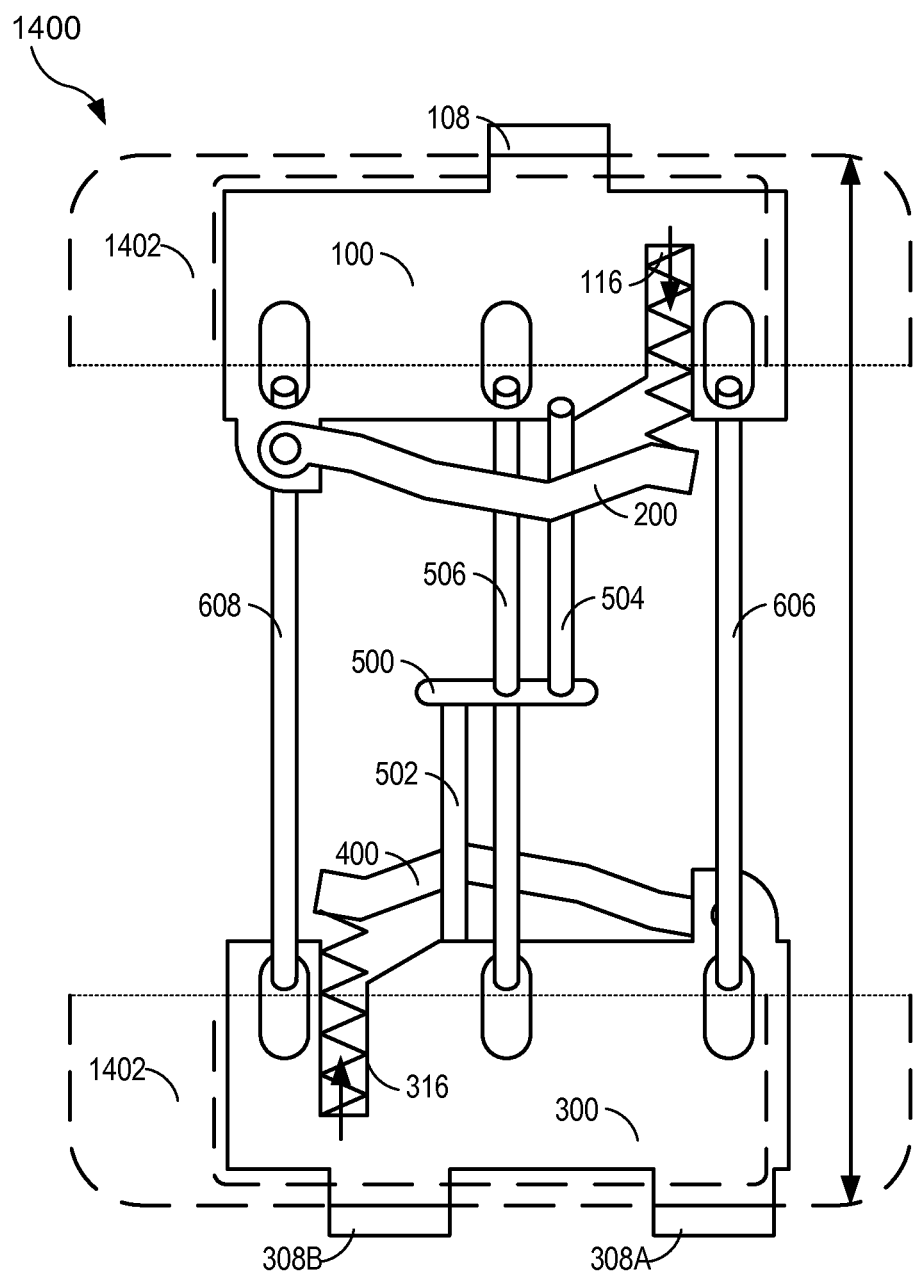
FIG. 14 is a simplified diagram of a holder mechanism in accordance with an exemplary embodiment of the present invention, with the adjustment lever in a closed position and an MFED in the holder mechanism.
Figure 15C:
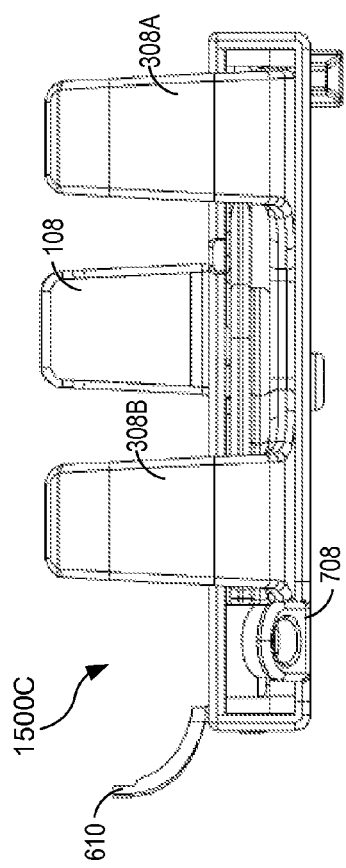
Figure 15D:
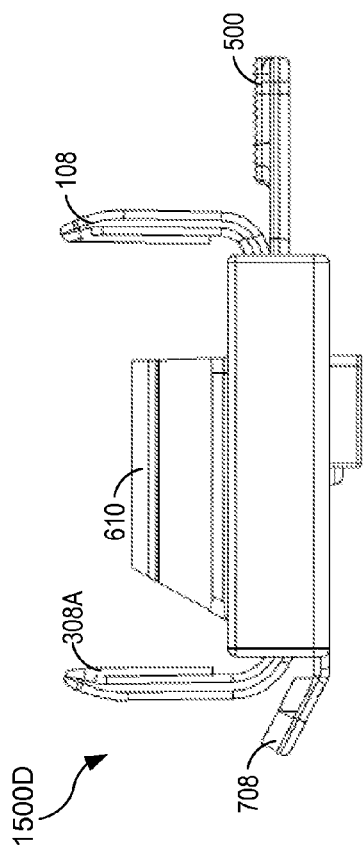
Figure 16C:
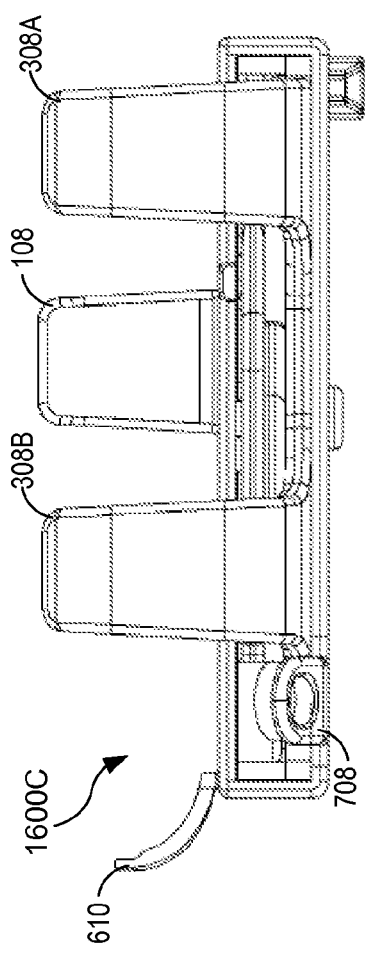
Figure 16D:
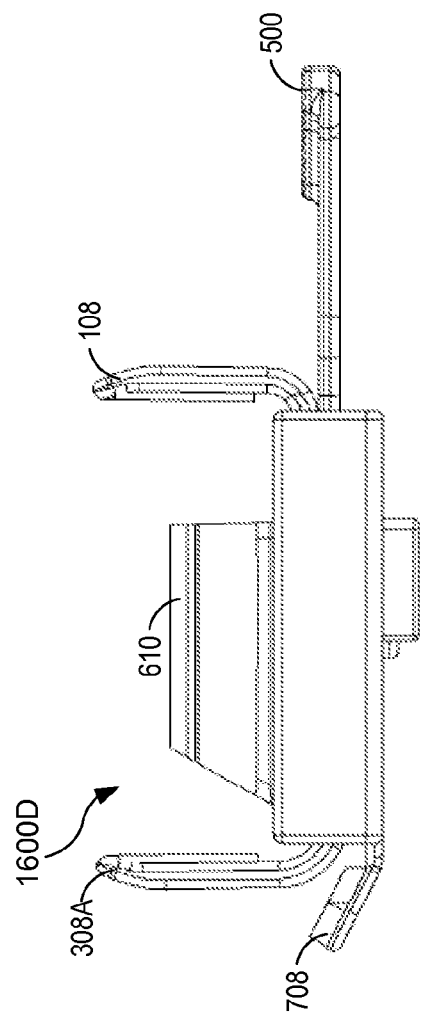
Figure 17B:
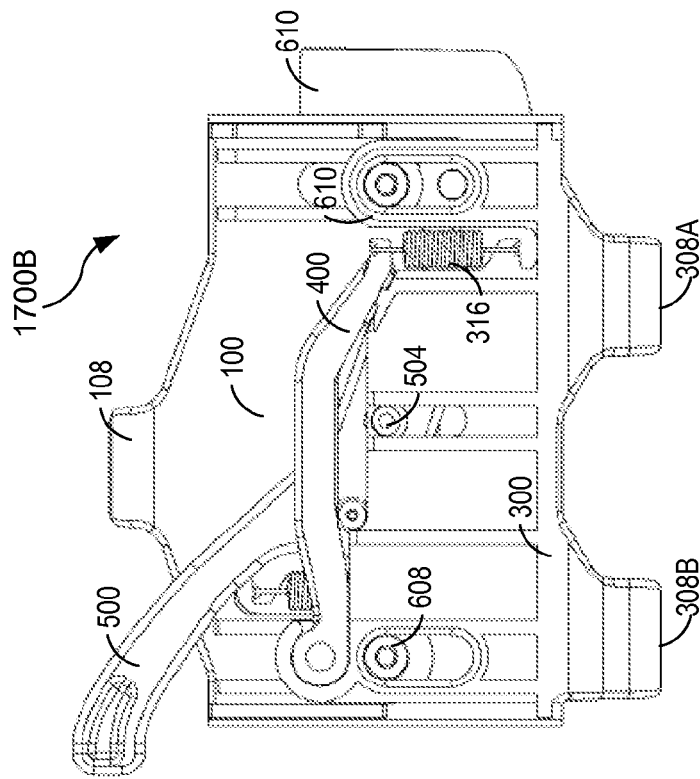
FIGS. 17A-17D are respectively scale top, bottom, right side, and far views of a holder mechanism in accordance with an exemplary embodiment of the present invention, with the adjustment lever in an open position.
Figure 17A:
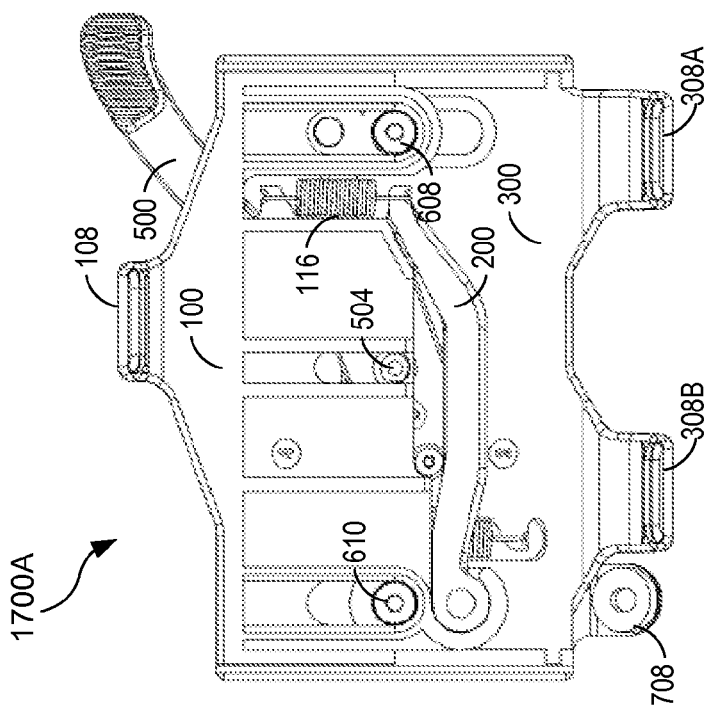
Figure 17C:
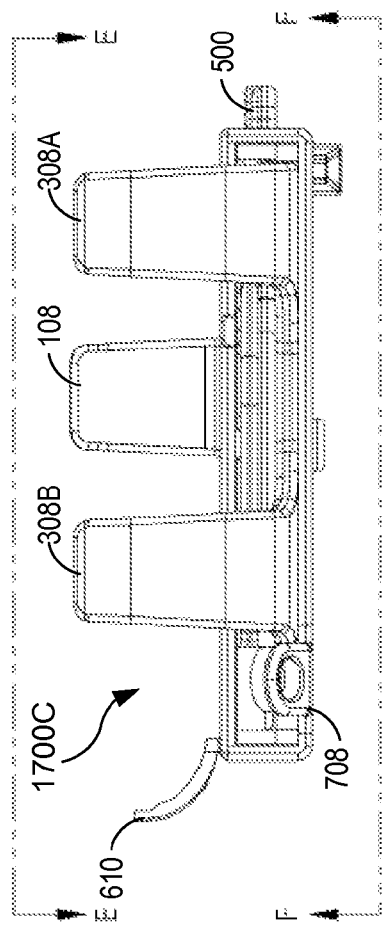
Figure 17D:
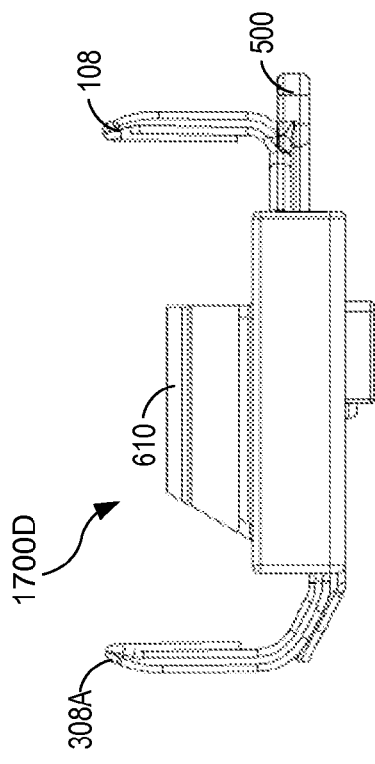
Figure 18A:
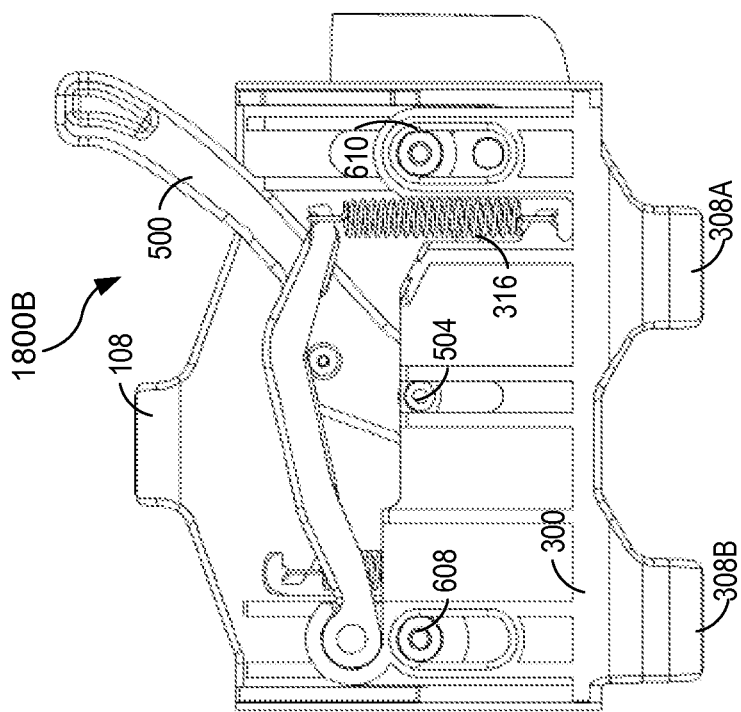
Figure 18B:
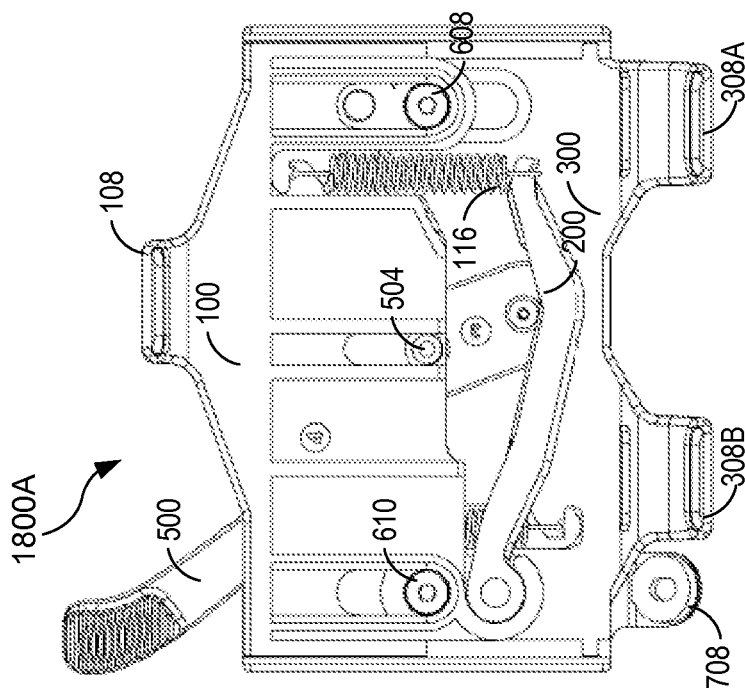

Referring to FIGS. 12-14, depicted are simplified diagrams of three configurations of the holder mechanism 1200, 1300, and 1400. Configurations 1200, 1300, and 1400 demonstrate the operation of the sliding plates 100 and 300 and adjustment lever 500. The components of the holder mechanism have been simplified and exaggerated for explanation. The upper and lower cover plates are not shown.

Far cover plate rod 606, near cover plate rod 608, and adjustment lever plate rod 506 are stationary and limit the horizontal movement of the upper and lower cover plates, upper sliding plate 100, lower sliding late 300, and adjustment lever 500. The upper and lower cover plates cannot move, because all three plate rods pass through holes in the cover plates. Adjustment lever 500 has only a single plate rod, adjustment lever plate rod 506, molded integrally with it, so adjustment lever 500 can rotate around adjustment lever plate rod 506 but cannot slide. The plate rods pass through slots, rather than holes, in upper sliding plate 100 and lower sliding plate 300. Upper sliding plate 100 and lower sliding plate 300 may slide towards and away from each other, but may slide no further than the widths of the slots.

Configuration 1200 shows the holder mechanism when adjustment lever 500 is at a "closed" position nearest to the user and the holder mechanism is empty. In configuration 1200 sliding plates 100 and 300 are as close as possible, causing the space between left finger 108 and right fingers 308A and 308B to be as narrow as possible. Springs 116 and 316 are refracted, pulling lever guide arms 200 and 400 adjacent to sliding plates 100 and 300.

To operate the holder mechanism, the user moves adjustment lever 500 to an "open" position furthest from the user. The components of the holder mechanism move in the directions shown by the arrows in configuration 1200 to the positions in configuration 1300. In particular, lower guide rod 502 and upper guide rod 504 move from positions furthest from the hinges of lever guide arms 200 and 400 to positions nearest to the hinges.

The movement of guide rods 502 and 504 push lever guide arms 200 and 400 and sliding plates 100 and 300. Because lever guide arms 200 and 400 are connected by springs 116 and 316 to sliding plates 100 and 300, movement of a lever guide arm will cause the respective spring to pull the respective sliding plate along and vice versa. Sliding plate 100 moves from a position where far and near cover plate rods 606 and 608 contact the left edges of its far and near slots to a position where far and near cover plate rods 606 and 608 contact the right edges of its far and near slots. Similarly, sliding plate 300 moves from a position where far and near cover plate rods 606 and 608 contact the right edges of its far and near slots to a position where far and near cover plate rods 606 and 608 contact the left edges of its far and near slots.

In configuration 1300 the upper and lower sliding plates 100 and 300 are as far apart as possible, causing the space between left finger 108 and right fingers 308A and 308B to be as wide as possible. The user may insert MFED 1402 between finger 108 and fingers 308A and 308B. The user may then move adjustment lever 500 back to its closed position nearest to the user. If the holder mechanism were empty, the components of the holder mechanism would move in the directions shown by the arrows in configuration 1300 back to the positions in configuration 1200. However, MFED 1402 forces finger 108 and fingers 308A and 308B apart, resulting in configuration 1400.

When the user moves adjustment lever 500 back to the closed position, lower guide rod 502 and upper guide rod 504 move counterclockwise away from the hinges of lever guide arms 200 and 400. Lower guide rod 502 and upper guide rod 504 push lever guide arms 200 and 400. Force from springs 116 and 316 causes sliding plates 100 and 300 to follow guide arms 200 and 400 and slide closer together. However, when finger 108 contacts the left side of the MFED and fingers 308A and 308B contact the right side of the MFED, sliding plates 100 and 300 cannot slide closer. Instead, springs 116 and 316 extend, causing the pads on fingers 108, 308A, and 308B to grip the MFED. Springs 116 and 316 are preloaded, minimizing the variation in force between the widest and narrowest gripping positions.

Referring to FIGS. 15A-15D, 16A-16D, 17A-17D, and 18A-18D, depicted are scale views 1500A-1500D, 1600A-1600D, 1700A-1700D, and 1800A-1800D of the components of the holder mechanism. In views 1500A-1500D and 1600A-1600D, the holder mechanism is empty. In views 1700A-1700D, the holder mechanism may be empty or may have an MFED placed in it. In views 1800A-1800D, the holder mechanism grips an MFED.

In views 1500A-1500D, adjustment lever 500 is at the closed position. In views 1600A-1600D, adjustment lever 500 is partway between the open position and the closed position. In views 1700A-1700D, adjustment lever 500 is in the open position. In views 1800A-1800D, an MFED has been placed in the holder mechanism and adjustment lever 500 is again in the closed position. Views 1500A, 1600A, 1700A, and 1800A are top views with the upper cover plate removed. Views 1500B, 1600B, 1700B, and 1800B are bottom views with the bottom cover plate removed. Views 1500C, 1600C, 1700C, and 1800C are right side views. Views 1500D, 1600D, 1700D, and 1800D are views from the side farthest from the user.

Figure 19B:
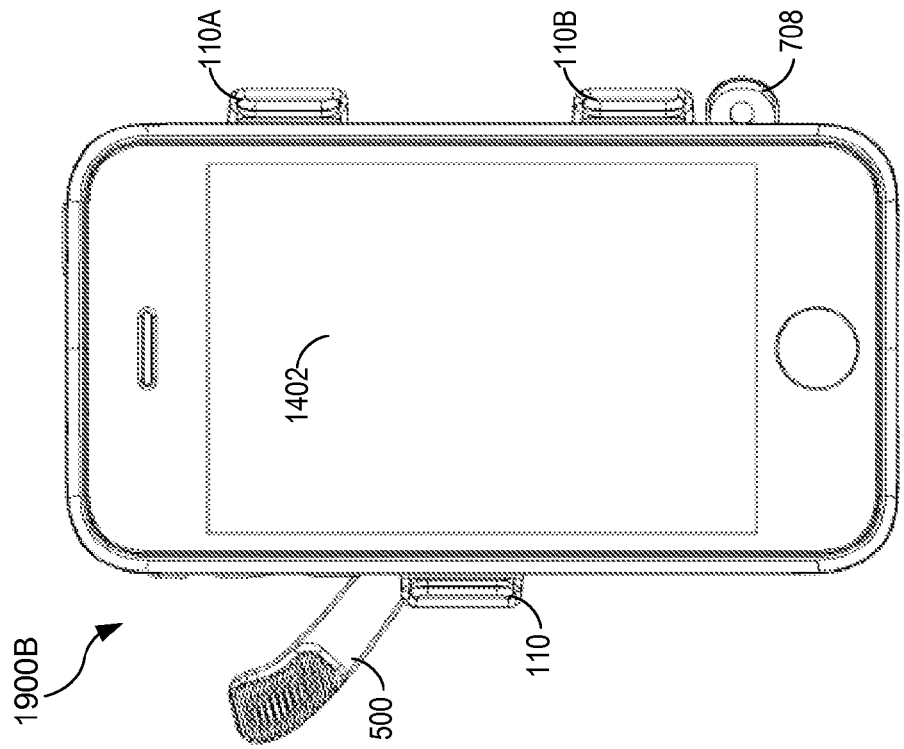
FIG. 19B is a scale top view of a holder mechanism in accordance with an exemplary embodiment of the present invention, with the holder mechanism holding an MFED with a case.
Figure 19A:
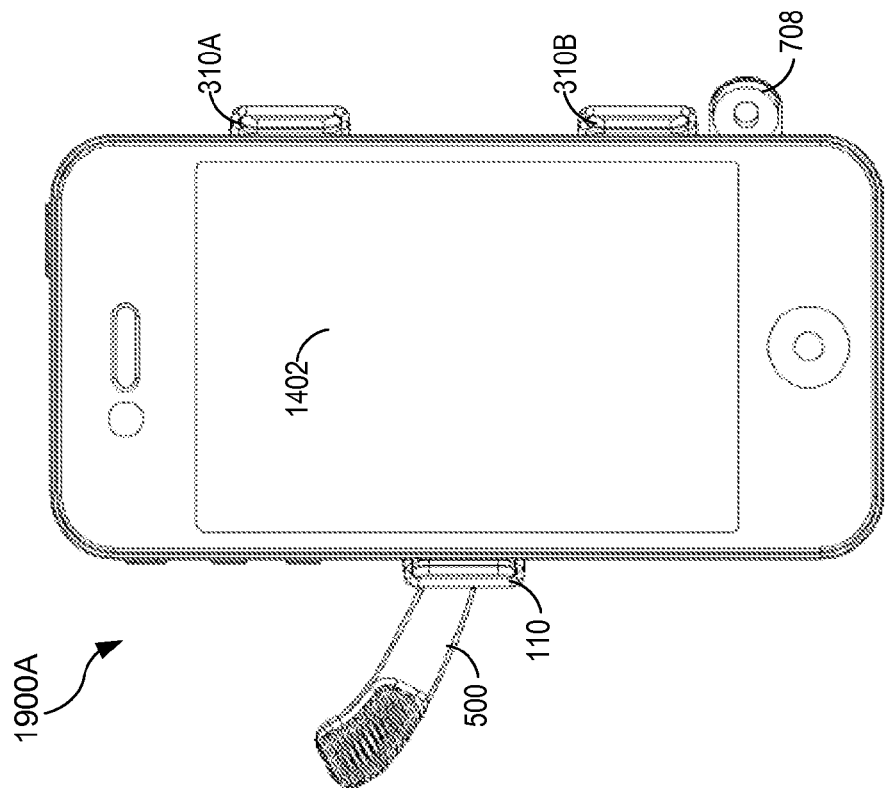
FIG. 19A is a scale top view of a holder mechanism in accordance with an exemplary embodiment of the present invention, with the holder mechanism holding an MFED without a case.

Referring to FIGS. 19A-19B, depicted are scale views 1900A and 1900B of the holder mechanism holding MFED 1402. In both views 1900A and 1900B, adjustment lever 500 is at the point where the springs begin to extend. In view 1900A MFED 1402 has no case, while in view 1900B MFED 1402 has a case, making it wider.

Figure 20:
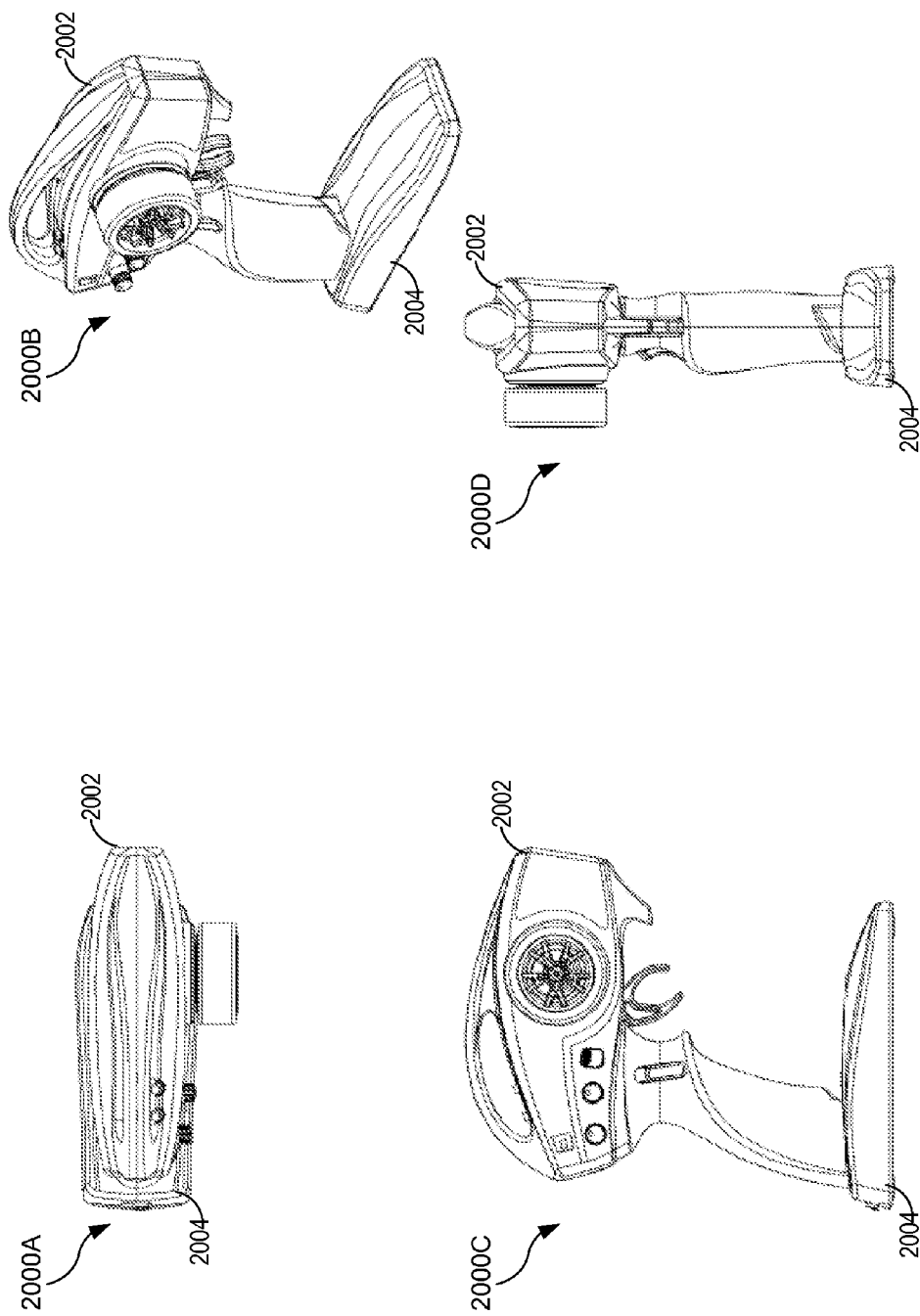
FIG. 20 is four views of a modular transmit controller having a mechanical user interface module and a simple base module.

Referring to FIG. 20, depicted are four views 2000A-D of a modular transmit controller having a mechanical user interface module 2002 and a simple base module 2004. Mechanical user interface module 2002 contains the standard user interface controls for the transmit controller, including a steering wheel and throttle trigger. Simple base module 2004 contains batteries which power mechanical user interface module 2002. Simple base module 2004 is not capable of communicating with an MFED.

Mechanical user interface module 2002 includes controls that would be expected for controlling a model automobile. The steering control on model mechanical user interface module 2002 is a steering wheel and the throttle control is a throttle trigger. However, a variety of other user interface controls are possible, depending on the vehicle to be controlled. For model airplanes, the steering control may be one or more sticks. The throttle control may also be a stick, and that stick may also be part of the steering control.

A user who does not plan to use an MFED as an auxiliary user interface may purchase a transmit controller with simple base module 2004. However, the user may later decide an MFED is desirable. Mechanical user interface module 2002 is modular, permitting it to be removed from simple base module 2004 and added to a base which is capable of communicating with an MFED.

Figure 21:
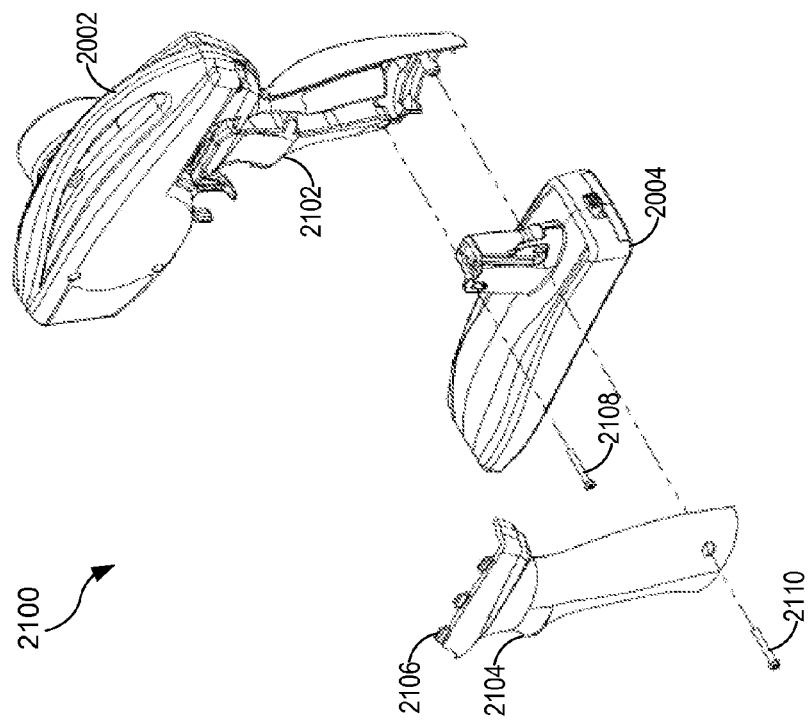
FIG. 21 is an exploded view of the connection between a mechanical user interface module and a simple base module.

Referring to FIG. 21, depicted is an exploded view of the connection between mechanical user interface module 2002 and simple base module 2004. Mechanical user interface module 2002 has a connector compartment 2102 which contains connectors for functions provided by the connected base. Simple base module 2004 has a battery which provides power, so a power connector from simple base module 2004 is connected to a power connector in connector compartment 2102. Simple base module 2004 also has a flat bottom surface which the transmit controller rests on.

Connector compartment 2102 is covered by compartment cover 2104. Compartment cover 2104 contains protrusions 2106 which slide into slots in connector compartment 2102, holding the upper end of compartment cover 2104 in place. Simple base module 2004 is connected to mechanical user interface module 2002 by screw 2108 and screw 2110. Screws 2108 and 2110 pass through holes in simple base module 2004 into sockets in mechanical user interface module 2002, attaching simple base module 2004 to mechanical user interface module 2002. Screw 2110 also passes through compartment cover 2104, holding the lower end of compartment cover 2104 in place.

Figure 22:
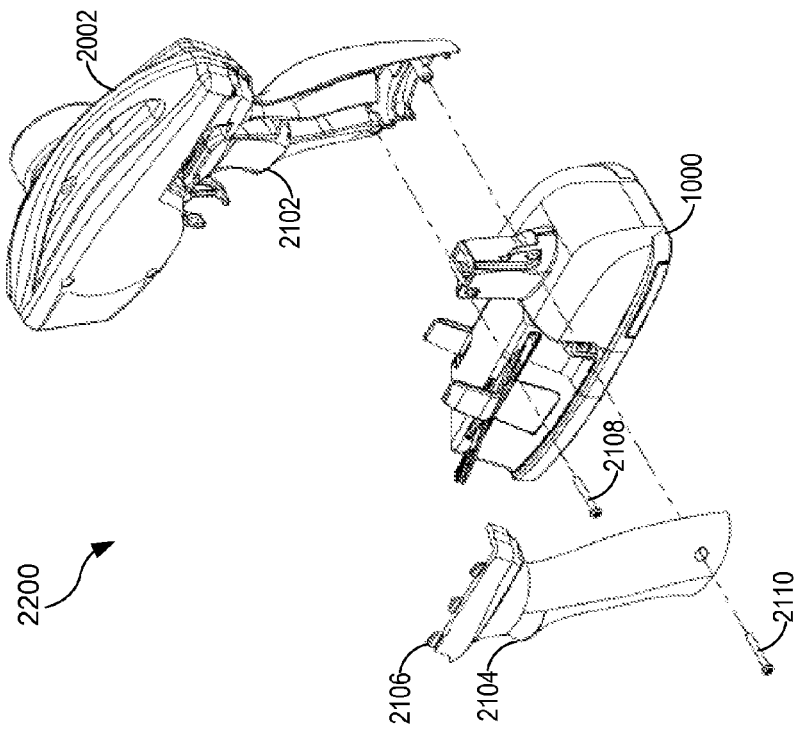
FIG. 22 is an exploded view of the connection between the mechanical user interface module and an MFED-compatible base module.
Figure 23:
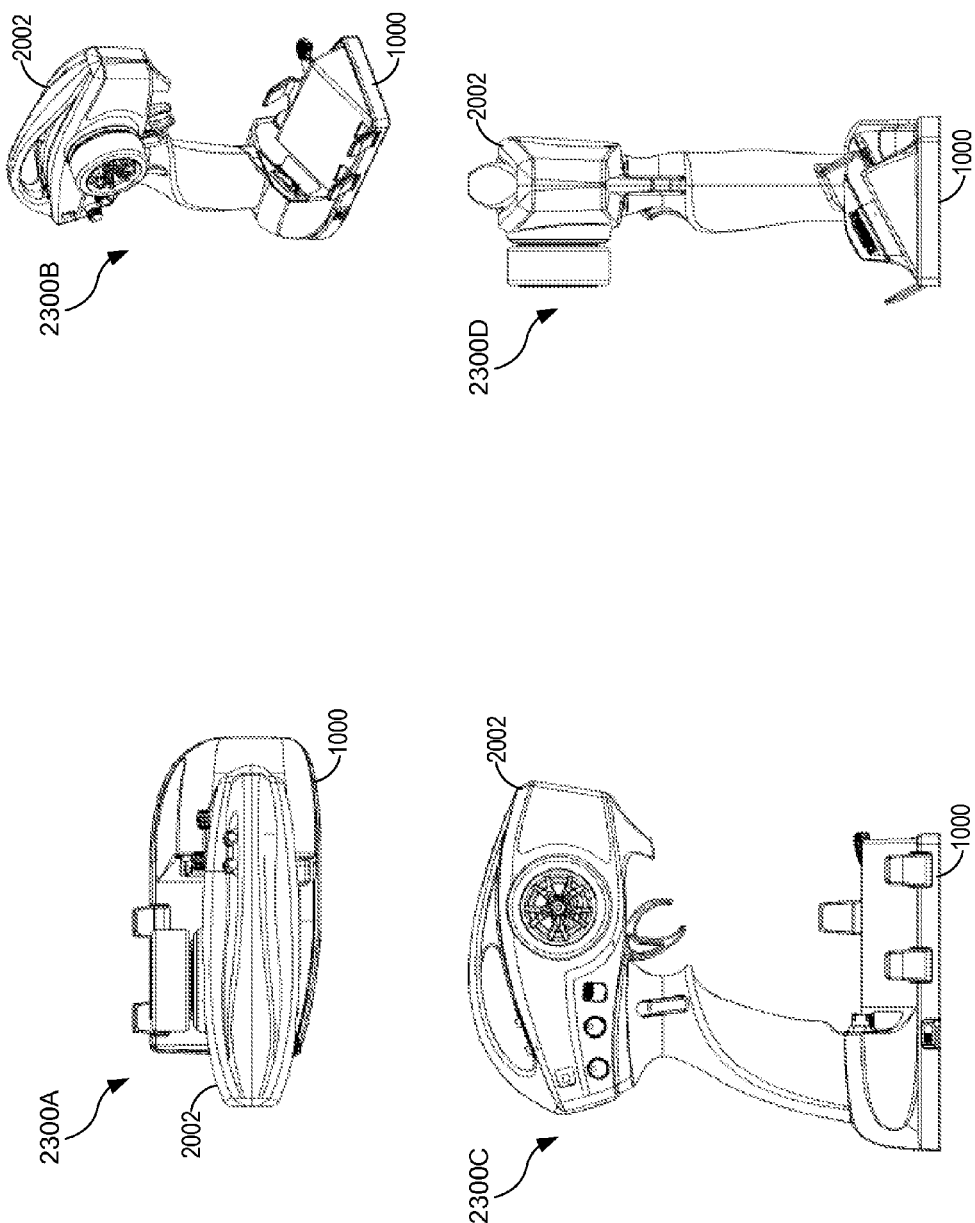
FIG. 23 is four views of a modular transmit controller having a mechanical user interface module and an MFED-compatible base module.

Referring to FIG. 22, depicted is an exploded view of the connection between mechanical user interface module 2002 and MFED-compatible base module 1000. MFED-compatible base module 1000 is connected to mechanical user interface module 2002 by screws 2108 and 2110 in the same way as simple base module 2004. In addition to power, MFED-compatible base module 1000 provides a data connection for communication between an MFED and mechanical user interface module 2002. Referring to FIG. 23, depicted are four views 2300A-D of an assembled modular transmit controller having the mechanical user interface module 2002 and the MFED-compatible base module 1000.

Referring to FIGS. 20-23, a user may purchase and use the transmit controller with simple base module 2004 shown in views 2000A-D. When the user wishes to obtain an MFED-compatible transmit controller, the user may purchase MFED-compatible base 1000. The user may remove screws 2108 and 2110, remove modular compartment cover 2104, and detach the power connector of simple base module 2004 from mechanical user interface module 2002. The user may then replace simple base module 2004 with MFED-compatible base module 1000, attach the power and data connectors of MFED-compatible base module 1000 to power and data connectors in connector compartment 2102, slide modular compartment cover 2104 into mechanical user interface module 2002, and insert screws 2108 and 2110. The user would then have the transmit controller shown in views 2300A-2300D, a transmit controller with mechanical user interface module 2002 and MFED-compatible base module 1000. The interchangeability of the bases allows mechanical user interface module 2002 to be reused, reducing the cost of upgrading to an MFED-compatible transmit controller.

In FIGS. 20-23, simple base module 2004 and MFED-compatible base module 1000 are shown to contain a battery power source for the transmit controller. It would also be possible to locate the battery power source in mechanical user interface module 2002, eliminating the need for a power connection between mechanical user interface module 2002 and a base. In this case, simple base module 2004 may contain no electronics. Simple base module 2004 would nonetheless have a purpose because of its bottom flat surface, which allows the transmit controller to stand upright.

It would also be possible to locate the auxiliary user interface connector in mechanical user interface module 2002 rather than MFED-compatible base module 1000. In this case, mechanical user interface module 2002 would be MFED-compatible regardless of which base module is used. The corresponding MFED-compatible base module could be identical to simple base module 2004 except for an MFED holder mechanism in the MFED-compatible base module.

Figure 24B:
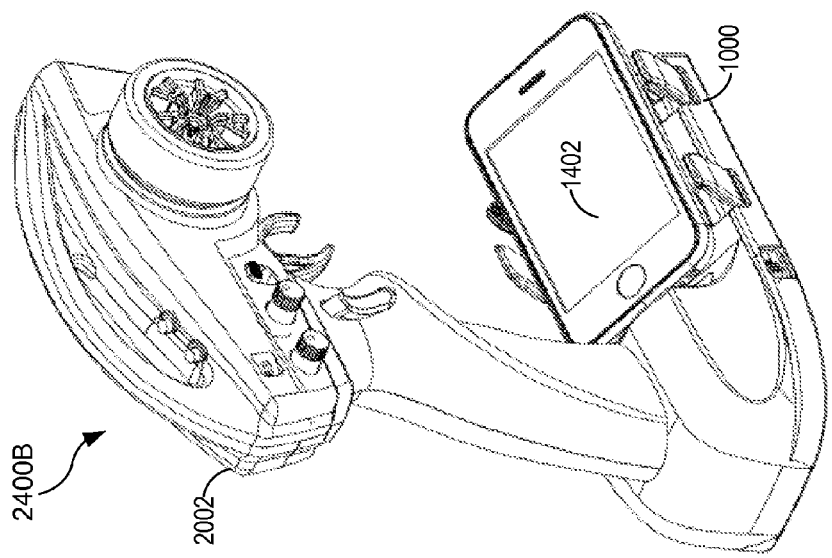
FIG. 24B is a view of an assembled transmit controller with an MFED.
Figure 24A:
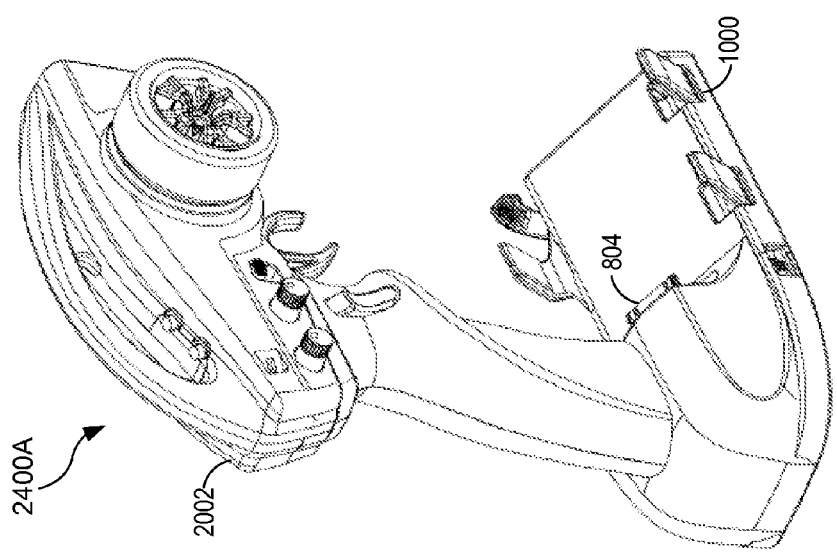
FIG. 24A is a view of an assembled transmit controller without an MFED.

Referring to FIGS. 24A-24B, depicted is a view 2400A of the assembled transmit controller without an MFED 1402 and a view 2400B of the assembled transmit controller with an MFED 1402. As described previously, to use the holder mechanism the user moves adjustment lever 500 to the open position, producing view 2400A. The user next connects MFED 1402 to MFED connector 804, producing view 2400B. The user then moves adjustment lever 500 to the closed position, causing the fingers to move to and grip the sides of MFED 1402.

Figure 26:
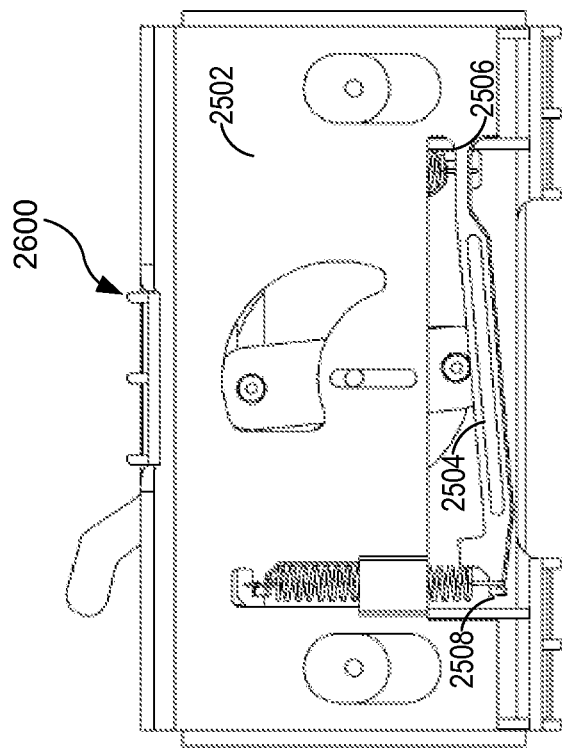
FIG. 26 is a scale top view of a flexure joint holder mechanism in accordance with an alternative exemplary embodiment of the present invention, with the adjustment lever in a closed position and an MFED in the holder mechanism.
Figure 25:
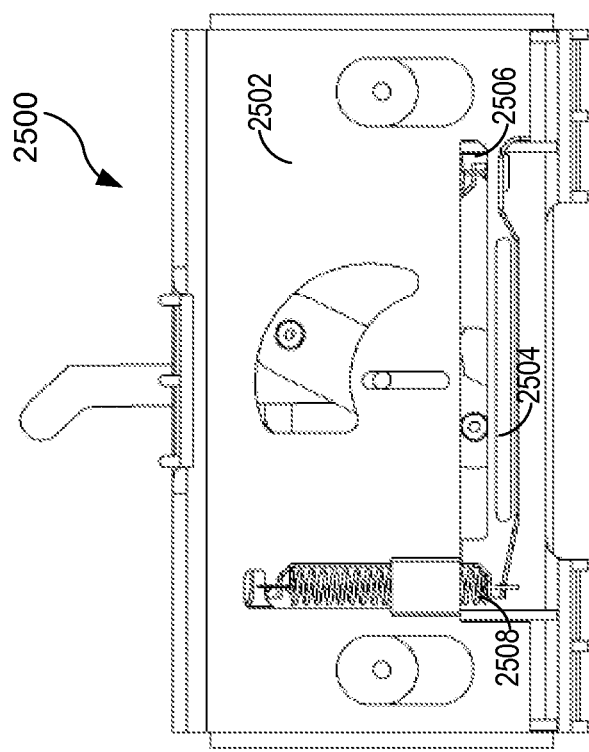
FIG. 25 is a scale top view of a flexure joint holder mechanism in accordance with an alternative exemplary embodiment of the present invention, with the adjustment lever partway between an open position and a closed position and no MFED in the holder mechanism.

Numerous variations of the previously described holder mechanism are possible. Referring to FIGS. 25-26, depicted are scale top views 2500 and 2600 of an alternate embodiment of the holder mechanism. In view 2500, the adjustment lever is in approximately the same position as in view 1600A and the holder mechanism does not contain an MFED. In view 2600, the adjustment lever is in approximately the same position as in view 1800A and the holder mechanism contains an MFED.

In this alternate embodiment, the holder mechanism has an alternate upper sliding plate 2502. Alternate upper sliding plate 2502 includes flexure jointed lever guide arm 2504 as part of the same piece. In contrast, in the previous embodiment the lever guide arms and sliding plates were separate pieces, with bosses in the lever guide arms fitting into lever guide arm ports in the sliding plates. Alternate upper sliding plate 2502 also has the positions of the lever guide arm hinge end 2506 and spring hook end 2508 reversed from the previous embodiment. Similar to the previous embodiment, lever arm portion 2504 may rotate around flexure joint 2504, and spring 2512 pulls spring hook end 2510 toward sliding plate portion 2502.

The corresponding alternate lower sliding plate, not depicted, likewise includes a flexure jointed lever guide arm as part of the same piece and has the positions of the hinge end and spring hook end of its flexure jointed lever guide arm reversed from the previous embodiment. Sliding plates with flexure jointed lever guide arms as part of the same piece are alternate embodiments of and may be substituted for the previously disclosed sliding plates and lever guide arms.

Figure 27:
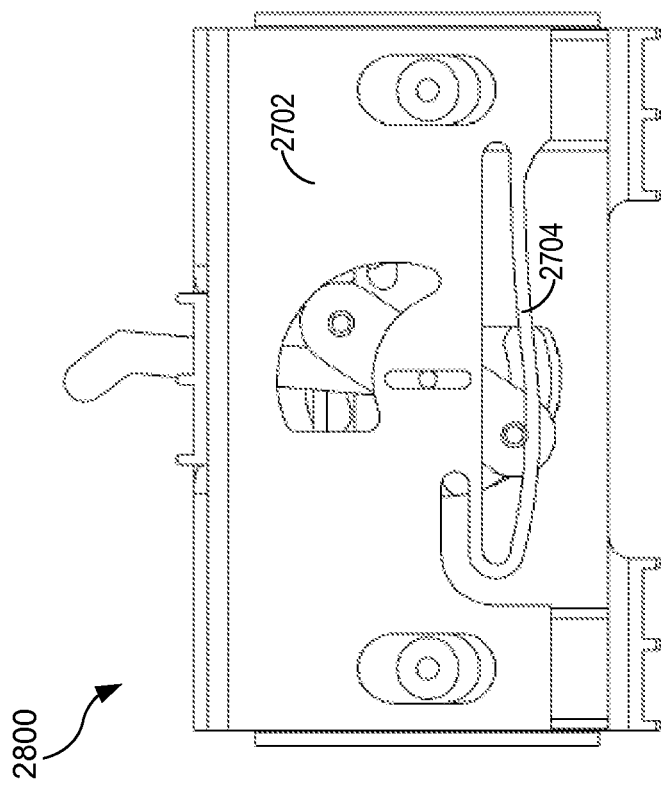
FIG. 27 is a scale top view of a leaf spring flexure holder mechanism in accordance with an alternative exemplary embodiment of the present invention, with the adjustment lever in an open position.
Figure 28:
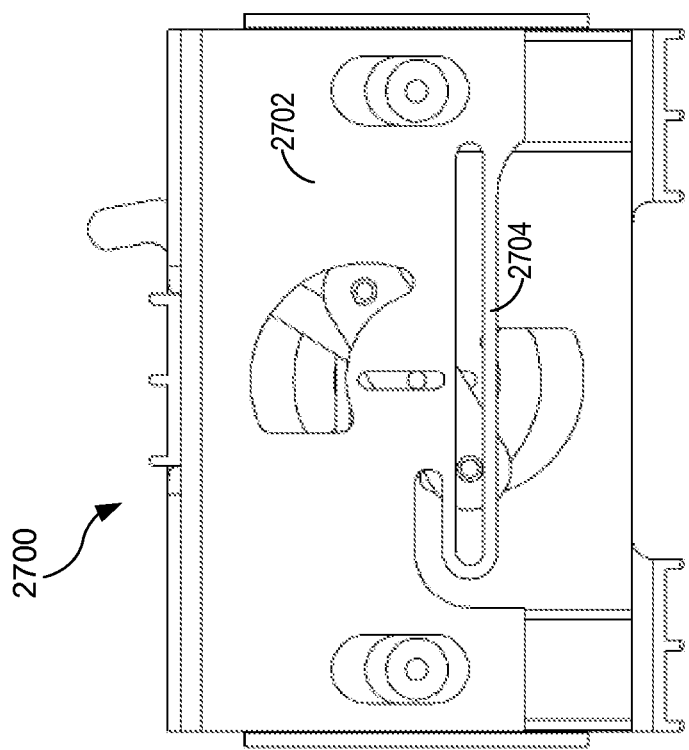
FIG. 28 is a scale top view of a leaf spring flexure holder mechanism in accordance with an alternative exemplary embodiment of the present invention, with the adjustment lever partway between an open position and a closed position and an MFED in the holder mechanism.

Referring to FIGS. 27-28, depicted are scale top views 2700 and 2800 of another alternate embodiment of the holder mechanism. In view 2700, the adjustment lever is in approximately the same position as in view 1700A and the holder mechanism does not contain an MFED. In view 2800, the adjustment lever is partway between the open and closed positions, comparable to the adjustment lever position in view 1600A, and the holder mechanism contains an MFED.

In this alternate embodiment, the holder mechanism has an alternate upper sliding plate 2702 as part of the same piece. Alternate upper sliding plate 2702 includes leaf spring flexure upper lever guide arm 2704. Leaf spring flexure upper lever guide arm 2704 replaces and functions as both the upper lever guide arms and springs in the previous embodiments.

As shown in view 2700, when the holder mechanism is empty leaf spring flexure upper lever guide arm 2704 is parallel to the left edge of alternate upper sliding plate 2702. When the upper lever guide rod pushes leaf spring flexure upper lever guide arm 2702, the rest of alternate upper sliding plate 2702 follows, and vice versa. When an MFED is placed in the holder mechanism and the holder mechanism is closed, leaf spring flexure upper lever guide arm 2704 bends outward like the extension of a leaf spring, as shown in view 2800. The resisting force from leaf spring flexure upper lever guide arm 2704 causes the holder mechanism to grip the MFED, similar to the compressive force exerted by the springs in the previous embodiments.

The corresponding alternate lower sliding plate, not depicted, includes a leaf spring flexure lower lever guide arm which functions in the same manner. The leaf spring flexure lever guide arms are alternate embodiments of and may be substituted for the previously disclosed lever guide arms and springs.

Variations of the holder mechanism can serve purposes other than holding an MFED to a transmit controller base. For instance, MFEDs are commonly used to provide audio in passenger vehicles. The holder mechanism could hold an MFED in place when it is connected to an audio system of a passenger vehicle.

Figure 29:
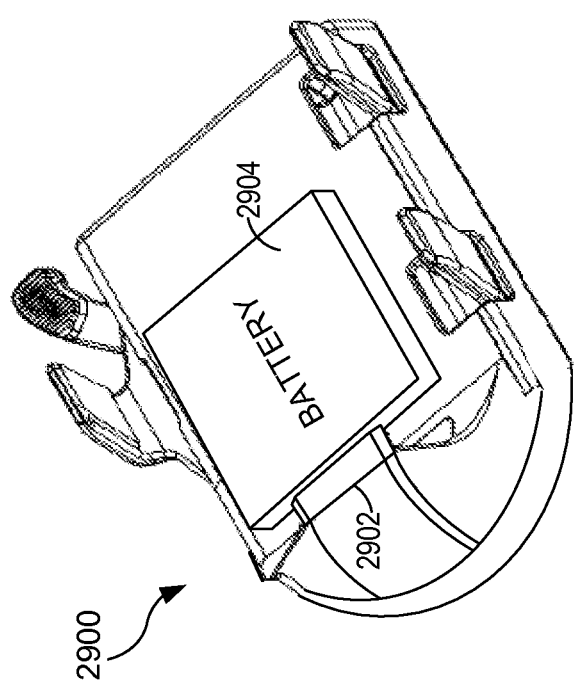
FIG. 29 is a view of a battery holder mechanism in accordance with an exemplary embodiment of the present invention.

Referring to FIG. 29, depicted is a battery holder mechanism 2900. Battery holder mechanism 2900 is similar to the holder mechanism in assembled MFED-compatible base module 1000 shown in FIG. 11, but is adapted to hold a battery in a model vehicle. Battery holder mechanism 2902 includes battery connector 2902 rather than an MFED connector. Battery connector 2904 receives a battery 2904 which powers the model vehicle. Battery holder mechanism 2900 can hold batteries of different sizes, because the fingers of the battery holder mechanism can move apart to grip a wider battery and together to grip a narrower battery.

Figure 30:
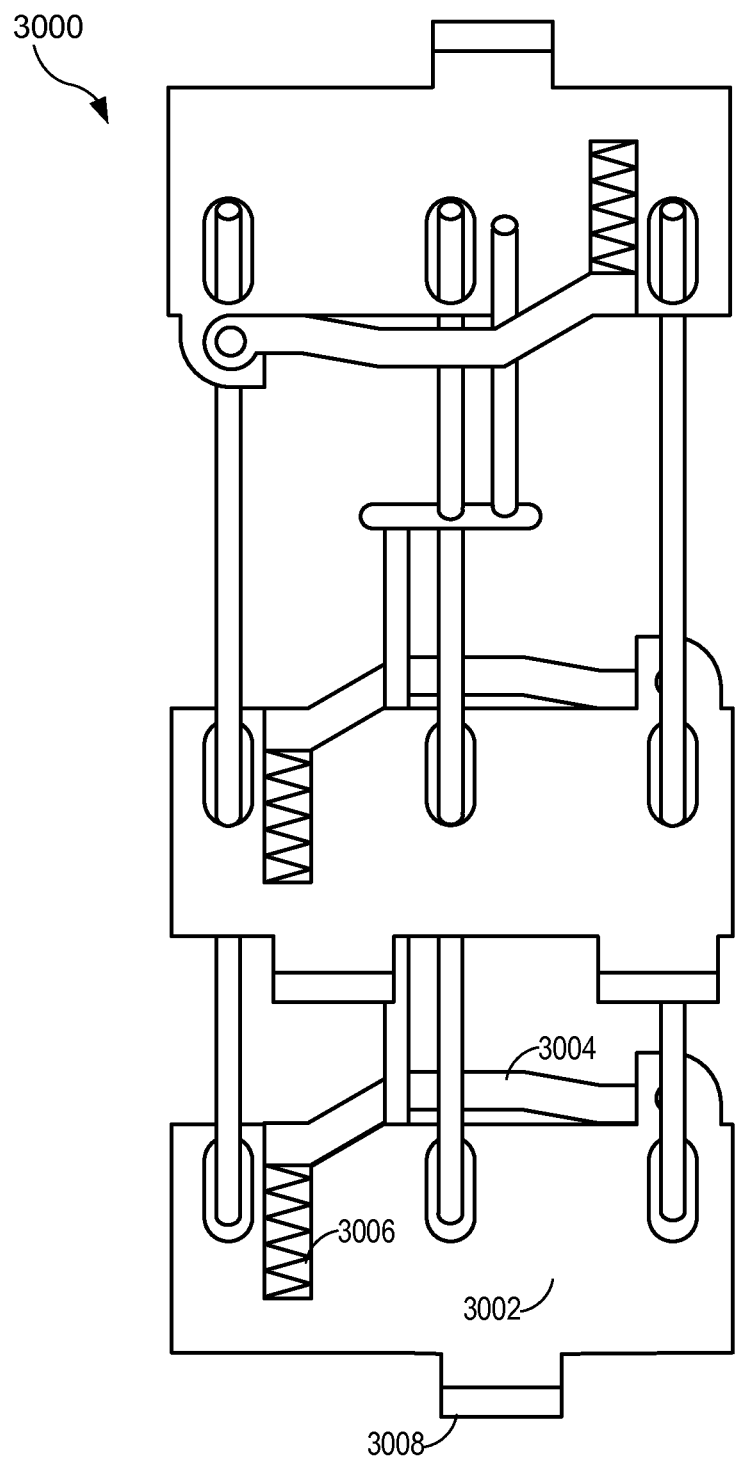
FIG. 30 is a simplified diagram of holder mechanism components in accordance with an alternative exemplary embodiment of the present invention, featuring a second lower sliding plate.

The holder mechanism design can also be modified to include more than two sliding plates. Referring to FIG. 30, depicted is a diagram of an extended holder mechanism 3000, simplified as in FIGS. 12-14. Extended holder mechanism 3000 has a second lower sliding plate 3002, a second lower lever guide arm 3004, and a second spring 3006. Second lower sliding plate 3002, second lower lever guide arm 3004, and second spring 3006 receive the plate rods and lower lever guide rod identically to the first lower sliding plate. Second lower sliding plate 3002 has a fourth finger 3008 which can grip an MFED from the right side. Additional lower or upper sliding plates could be added in the same manner.

Figure 31:
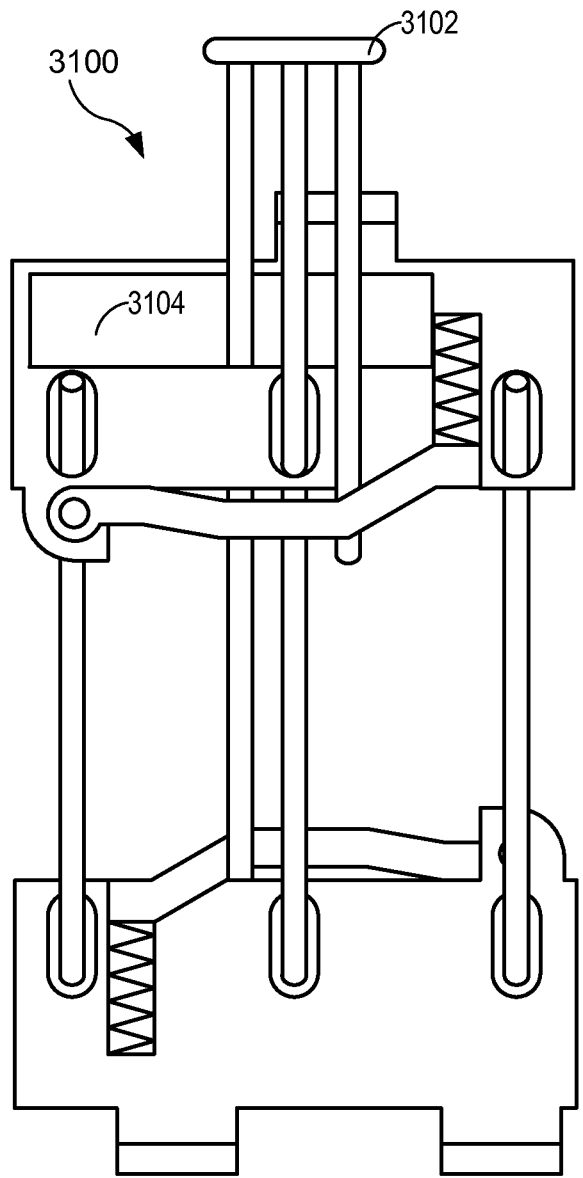
FIG. 31 is a simplified diagram of a holder mechanism in accordance with an alternative exemplary embodiment of the present invention, having an adjustment lever above both sliding plates.

The position of the adjustment lever can also be changed to be above or below any sliding plate. Referring to FIG. 31, depicted is a diagram of an alternate holder mechanism 3100, simplified as in FIGS. 12-14. Alternate holder mechanism 3100 has its adjustment lever 3102 above both sliding plates, rather than between the upper and lower sliding plates. The upper sliding plate has a window 3104 for the lower lever guide rod to pass through.

Figure 32:
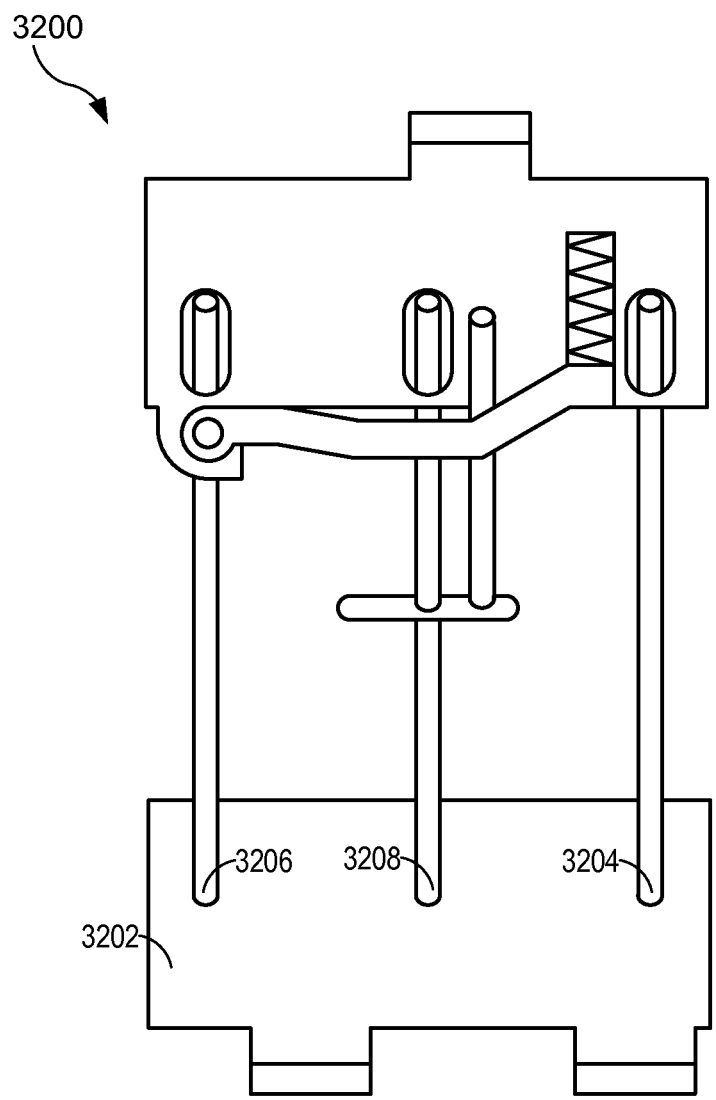
FIG. 32 is a simplified diagram of a holder mechanism in accordance with an alternative exemplary embodiment of the present invention, having a single sliding plate.

A holder mechanism with only a single sliding plate is possible. Referring to FIG. 32, depicted is a diagram of an alternate holder mechanism 3200, simplified as in FIGS. 12-14. Alternate holder mechanism 3200 has a lower fixed plate 3202 in place of the lower sliding plate in previous embodiments, and has no lower lever guide arm, lower lever guide arm port, or lower spring. Because lower fixed plate 3202 does not slide, lower fixed plate 3202 has far hole 3204, near hole 3206, and middle hole 3208 in place of far, near, and middle slots. The far, near, and adjustment lever plate rods pass through these holes into the lower cover plate. Alternately, lower fixed plate 3202 can itself be the lower cover plate. An upper fixed plate with a lower sliding plate could be used in another embodiment.

An embodiment with sliding plates sliding along multiple axes, to grip the MFED from more than two sides, is possible.

Figure 33:
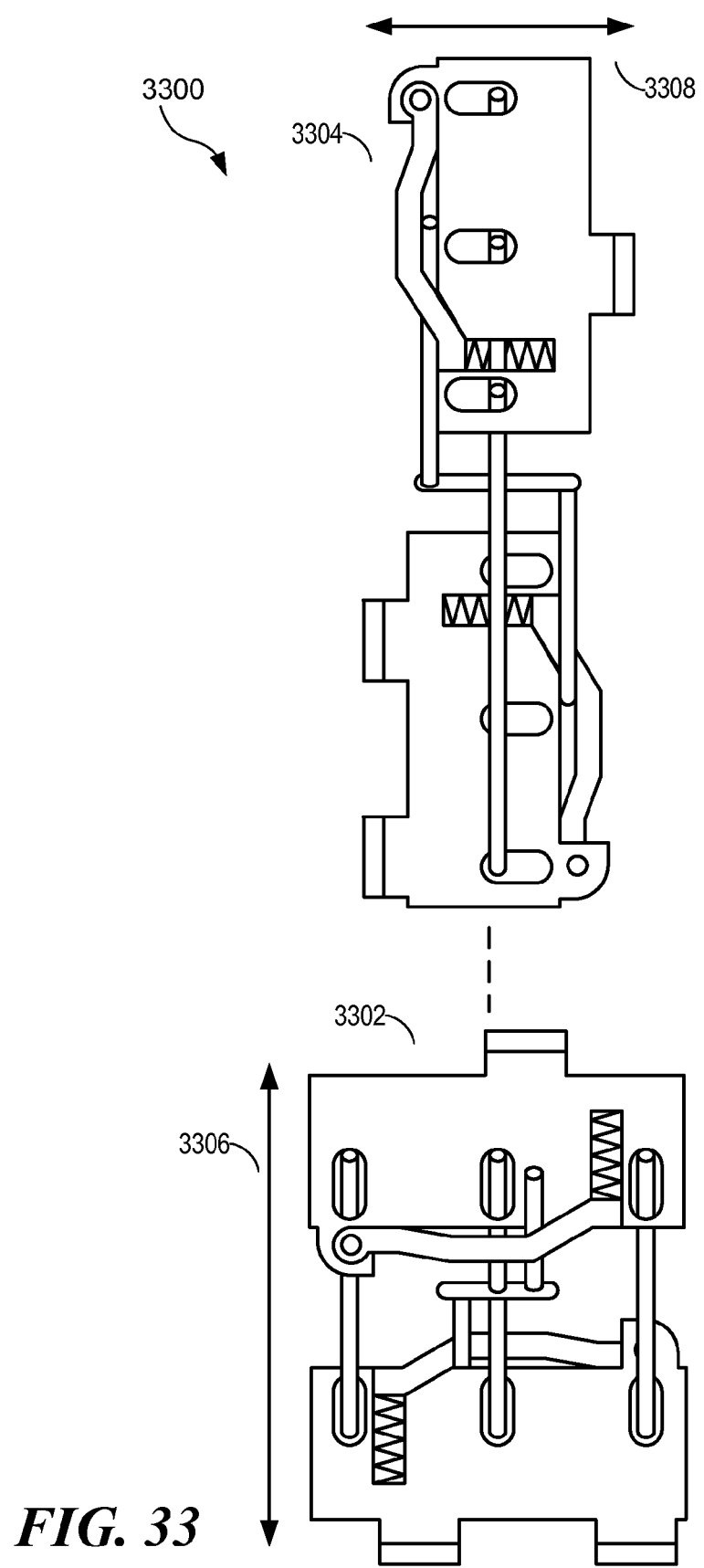
FIG. 33 is a simplified diagram of a four-sided holder mechanism in accordance with an alternative exemplary embodiment of the present invention.

Referring to FIG. 33, depicted is a diagram of a four-sided holder mechanism 3300, simplified as in FIGS. 12-14. Four-sided holder mechanism 3300 has a first holder mechanism part 3302 and a second holder mechanism part 3304. First holder mechanism part 3302 is identical to the holder mechanism described with respect to FIGS. 12-14, including upper and lower cover plates which are not depicted. Second holder mechanism part 3304 is identical to first holder mechanism part 3302, including separate upper and lower cover plates which are not depicted, but is rotated 90 degrees with respect to first holder mechanism part 3302. The fingers of first holder mechanism part 3306 move along a left-right axis 3306 relative to the user's perspective. The fingers of second holder mechanism part 3308 move along a perpendicular far-near axis 3308 relative to the user's perspective. Four-sided holder mechanism 3300 can grip an MFED from the left and right sides with the fingers of first holder mechanism part 3302, and can grip an MFED from the far and near sides with the fingers of second holder mechanism part 3304.

It is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of various embodiments.

In particular, one of the purposes of the cover plate rods and the adjustment lever plate rod in the disclosed holder mechanism embodiment is to prevent the sliding movement of the cover plates, the sliding plates, and the adjustment lever. In the disclosed embodiment the cover plate rods are screws and the adjustment plate rod is an upper and lower protrusion from the adjustment lever. However, trivial modifications would include making any of the three plate rods protrusions from the upper or lower cover plates, or making the adjustment lever plate rod a screw. To account for the varying possibilities in describing the relationship between the plate rods and the cover plates and adjustment lever, the plate rods may be said to be "connected" to the cover plates and adjustment lever.

The invention claimed is:
1. A holder mechanism comprising:
an upper sliding plate comprising an adjustment lever plate rod slot and one or more fingers;
an upper lever guide arm comprising a hinge end and a spring end, the upper lever guide arm hinged to the upper sliding plate at the hinge end;
an upper spring pulling the spring end of the upper lever guide arm and the upper sliding plate together;
a lower sliding plate comprising an adjustment lever plate rod slot and one or more fingers;
a lower lever guide arm comprising a hinge end and a spring end, the lower lever guide arm hinged to the lower sliding plate at the hinge end;
a lower spring pulling the spring end of the lower lever guide arm and the lower sliding plate together;
an adjustment lever above the lower sliding plate and below the upper sliding plate, the adjustment lever comprising:
an upper guide rod between the upper sliding plate and the upper lever guide arm; and
a lower guide rod between the lower sliding plate and the lower lever guide arm; and
an adjustment lever plate rod passing through the adjustment lever plate rod slot of the upper sliding plate, pass- ing through the adjustment lever plate rod slot of the lower sliding plate, and connected to the adjustment lever.

2. The holder mechanism of claim 1, wherein:
the upper sliding plate further comprises a first cover plate rod slot and a second cover plate rod slot; and
the lower sliding plate further comprises a first cover plate rod slot and a second cover plate rod slot;
and further comprising:
an upper cover plate comprising a first cover plate rod connection and a second cover plate rod connection;
a lower cover plate comprising a first cover plate rod connection and a second cover plate rod connection;
a first cover plate rod, the first cover plate rod passing through the first cover plate rod slot in the upper sliding plate and the first cover plate rod slot in the lower sliding plate, and the first cover plate rod connected to the first cover plate rod connection of the upper cover plate and the first cover plate rod connection of the lower cover plate; and
a second cover plate rod, the second cover plate rod passing through the second cover plate rod slot in the upper sliding plate and the second cover plate rod slot in the lower sliding plate, and the second cover plate rod connected to the second cover plate rod connection of the upper cover plate and the second cover plate rod connection of the lower cover plate.

3. The holder mechanism of claim 2, wherein the first cover plate rod connection of the upper cover plate, the second cover plate rod connection of the upper cover plate, the first cover plate rod connection of the lower cover plate, and the second plate rod connection of the lower cover plate comprise holes.

4. The holder mechanism of claim 3, further comprising:
a first cover plate rod screw, the shank of the first cover plate rod screw comprising the first cover plate rod; and
a second cover plate rod screw, the shank of the second cover plate rod screw comprising the second cover plate rod; and wherein
at least one of the first cover plate rod connection of the upper cover plate and the first plate rod connection of the lower cover plate is threaded; and
at least one of the second cover plate rod connection of the upper cover plate and the second plate rod connection of the lower cover plate is threaded.

5. The holder mechanism of claim 1, wherein the adjustment lever plate rod is a portion of the adjustment lever.

6. The holder mechanism of claim 1, wherein:
the upper spring is preloaded; and
the lower spring is preloaded.

7. The holder mechanism of claim 1, wherein:
each of the one or more fingers of the upper sliding plate comprises a pad; and
each of the one or more fingers of the lower sliding plate comprises a pad.

8. A holder mechanism comprising:
a first sliding plate;
a second sliding plate;
fixing means for fixing the range of sliding movement together and apart of the first sliding plate and the second sliding plate;
first gripping means coupled to the first sliding plate, the first gripping means for gripping a device;
second gripping means coupled to the second sliding plate, the second gripping means for gripping the device;
adjustment means for adjusting the position of the first sliding plate relative to the second sliding plate within the range of sliding movement, the adjustment means having a first position and a second position, the position of the first sliding plate relative to the second sliding plate closest together in the range when the adjustment means is in the first position and the device is not between the first and second gripping means, the position of the first sliding plate relative to the second sliding plate farthest apart in the range when the adjustment means is in the second position;
moving means for moving the first sliding plate and the second sliding plate apart when the adjustment means is moved toward the second position; and
pulling means for pulling the first sliding plate and the second sliding plate toward each other when the adjustment means is in the first position and the device is between the first and second gripping means.

9. A method of holding a device, the method comprising:
an upper spring pulling a spring end of an upper lever guide arm and an upper sliding plate together, the upper lever guide arm hinged to the upper sliding plate at a hinge end of the upper lever guide arm;
a lower spring pulling a spring end of a lower lever guide arm and a lower sliding plate together, the lower lever guide arm hinged to the lower sliding plate at a hinge end of the lower lever guide arm;
moving an adjustment lever from a first position to a second position, thereby:
causing an upper lever guide rod to move the upper sliding plate away from the lower sliding plate; and
causing a lower lever guide rod to move the lower sliding plate away from the upper sliding plate;
inserting the device between a finger of the upper sliding late and a finger of the lower sliding plate;
moving the adjustment lever from the second position to the first position, thereby:
causing the upper lever guide rod to move the upper sliding plate toward the lower sliding plate; and
causing the lower lever guide rod to move the lower sliding plate toward the upper sliding plate;
the upper spring extending in response to contact between the finger of the upper sliding plate and the device; and
the lower spring extending in response to contact between the finger of the lower sliding plate and the device.

10. A holder mechanism comprising:
a sliding plate;
a lever guide arm comprising at least a first end elastically connected to the sliding plate;
a lever guide rod between the sliding plate and the lever guide arm;
an adjustment lever pivotally mounted relative to the sliding plate and attached to the lever guide rod, the adjustment lever pivotably movable between a first position and a second position relative to the sliding plate, wherein:
movement of the adjustment lever from the first position to the second position causes the lever guide rod to push the sliding plate in a first direction; and
movement of the adjustment lever from the second position to the first position causes the lever guide rod to push the sliding plate in a second direction;
further comprising at least one plate rod passing through a slot in the sliding plate.

11. The holder mechanism of claim 10, wherein the sliding plate comprises the lever guide arm.

12. The holder mechanism of claim 10, further comprising a spring forming the elastic connection between the first end of the lever guide arm and the sliding plate.

13. The holder mechanism of claim 10, wherein the lever guide arm is deformable and the deformability of the lever guide arm forms the elastic connection between the first end of the lever guide arm and the sliding plate.

14. The holder mechanism of claim 10, further comprising a second end of the lever guide arm connected by a joint permitting rotational movement of the lever guide arm with respect to the sliding plate.

15. The holder mechanism of claim 10, wherein the joint comprises:
   a cylindrical portion of one of the sliding late or the lever guide arm;
   a socket portion of the other of the sliding plate or the lever guide arm, the socket portion receiving the cylindrical portion.

16. The holder mechanism of claim 10, wherein the joint comprises a flexure joint.

17. The holder mechanism of claim 10, wherein the adjustment lever is above the sliding plate.

18. The holder mechanism of claim 10, wherein the adjustment lever is below the sliding plate.

19. The holder mechanism of claim 10, wherein the plate rod is attached to the adjustment lever.

\* \* \* \* \*